US012580699B2

(12) United States Patent
Ren et al.

(10) Patent No.: US 12,580,699 B2
(45) Date of Patent: Mar. 17, 2026

(54) UPLINK SIGNAL ASSISTED PRECONFIGURED UPLINK RESOURCE

(71) Applicant: QUALCOMM Incorporated, San Diego, CA (US)

(72) Inventors: Yuwei Ren, Beijing (CN); Huilin Xu, Temecula, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 18/036,873

(22) PCT Filed: Jan. 29, 2021

(86) PCT No.: PCT/CN2021/074435
§ 371 (c)(1),
(2) Date: May 12, 2023

(87) PCT Pub. No.: WO2022/160254
PCT Pub. Date: Aug. 4, 2022

(65) Prior Publication Data
US 2024/0022369 A1 Jan. 18, 2024

(51) Int. Cl.
*H04L 5/00* (2006.01)
*H04L 1/1607* (2023.01)
(Continued)

(52) U.S. Cl.
CPC .......... *H04L 5/0048* (2013.01); *H04L 1/1671* (2013.01); *H04L 1/1864* (2013.01);
(Continued)

(58) Field of Classification Search
CPC ... H04L 1/1671; H04L 1/1864; H04L 5/0048; H04L 5/0055; H04L 5/0094; H04W 72/1268
See application file for complete search history.

(56) References Cited

U.S. PATENT DOCUMENTS

2021/0194734 A1* 6/2021 Herath .............. H04W 56/0005
2022/0030605 A1* 1/2022 Hu ......................... H04L 5/0023
(Continued)

FOREIGN PATENT DOCUMENTS

CN 109246744 A 1/2019
CN 109756991 A 5/2019
(Continued)

OTHER PUBLICATIONS

International Search Report and Written Opinion—PCT/CN2021/074435—ISA/EPO—Oct. 20, 2021.
(Continued)

*Primary Examiner* — Pao Sinkantarakorn
(74) *Attorney, Agent, or Firm* — Procopio, Cory, Hargreaves & Savitch LLP

(57) ABSTRACT

A UE in one of an RRC idle mode or an RRC inactive mode may transmit a plurality of UL reference signals to the base station, receive a first L1 ACK message based on the transmission of the plurality of UL signals from the base station, and transmit UL data via at least one PUR based on the received first L1 ACK message. The plurality of UL signals may include SRS. The UE may receive a PUR configuration from the base station. The UE may determine to drop the transmission of one or more first UL signals, or the base station may determine to omit the transmission of the first L1 ACK message in response to one or more first UL signals, based on L1 ACK density or L1 ACK message in the L1 ACK monitoring window.

28 Claims, 15 Drawing Sheets

(51) Int. Cl.
H04L 1/1829 (2023.01)
H04W 72/1268 (2023.01)

(52) U.S. Cl.
CPC .......... H04L 5/0055 (2013.01); H04L 5/0094
(2013.01); H04W 72/1268 (2013.01)

(56) References Cited

U.S. PATENT DOCUMENTS

| | | | | |
|---|---|---|---|---|
| 2022/0182205 A1* | 6/2022 | Höglund | ............... | H04L 5/0055 |
| 2022/0240341 A1* | 7/2022 | Kim | ..................... | H04L 5/0048 |
| 2024/0137793 A1* | 4/2024 | Choe | .................... | H04L 1/1854 |

FOREIGN PATENT DOCUMENTS

| | | |
|---|---|---|
| WO | 2019032222 A1 | 2/2019 |
| WO | 2020167102 A1 | 8/2020 |

OTHER PUBLICATIONS

Huawei, et al., "UL Transmission in Preconfigured Resource", 3GPP TSG RAN WG1 Meeting #99, R1-1911918, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 8 Pages, XP051823100, p. 4.
Supplementary European Search Report—EP21921859—Search Authority—The Hague—Oct. 7, 2024—7 pages.

* cited by examiner

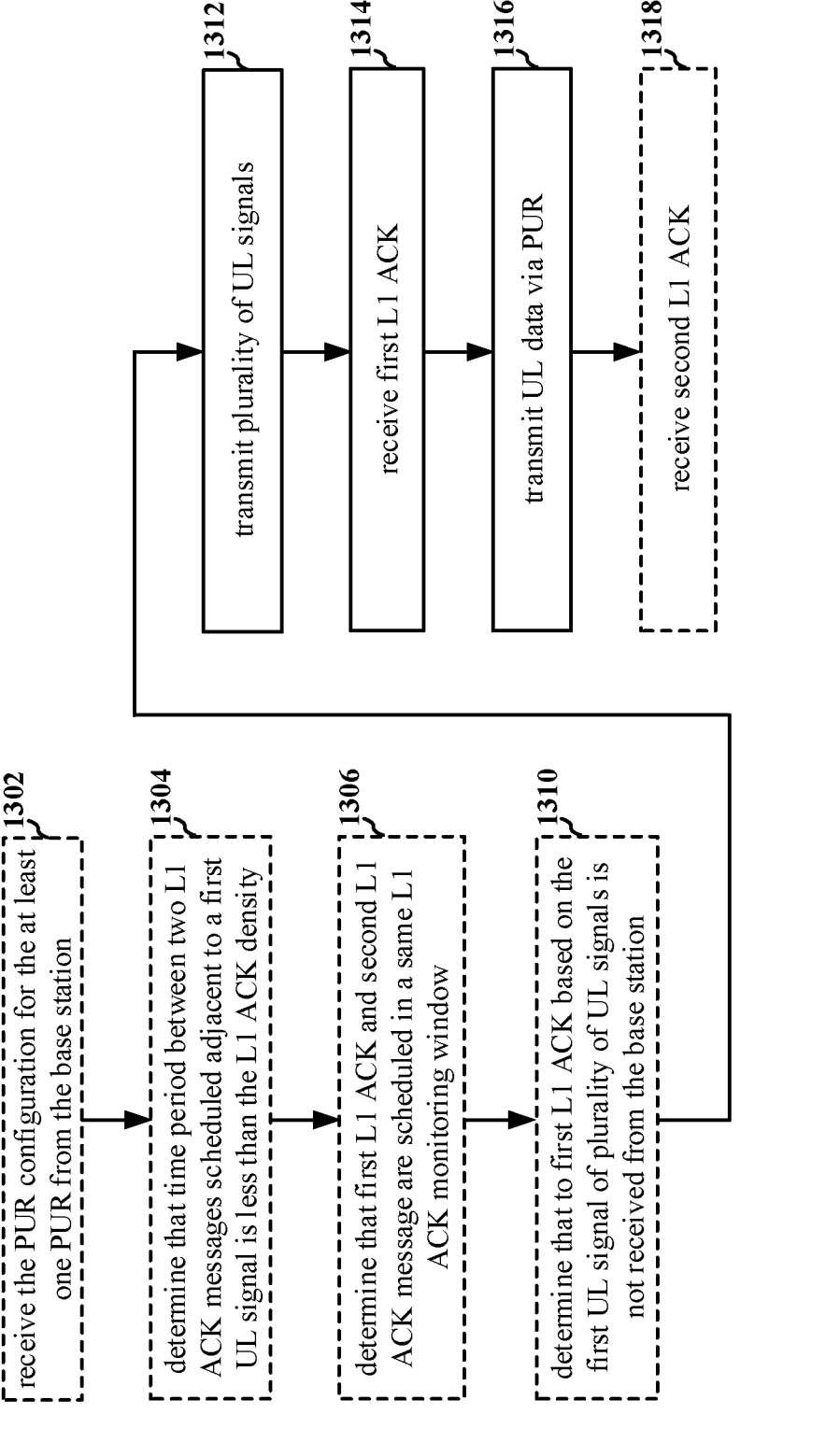

FIG. 13

1312 transmit plurality of UL signals 1314 receive first L1 ACK 1316 transmit UL data via PUR 1318 receive second L1 ACK 1302 receive the PUR configuration for the at least one PUR from the base station 1304 determine that time period between two L1 ACK messages scheduled adjacent to a first UL signal is less than the L1 ACK density 1306 determine that first L1 ACK and second L1 ACK message are scheduled in a same L1 ACK monitoring window 1310 determine that to first L1 ACK based on the first UL signal of plurality of UL signals is not received from the base station

1300

UPLINK SIGNAL ASSISTED PRECONFIGURED UPLINK RESOURCE

BACKGROUND

Technical Field

The present disclosure relates generally to communication systems, and more particularly, to a method and apparatus to provide a preconfigured uplink resource (PUR) assisted by a separate uplink signal.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5GNR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a UE. A UE may transmit, to a base station, a plurality of uplink (UL) signals, the UE being in one of a radio resource control (RRC) idle mode or an RRC inactive mode, receive, from the base station, a first physical layer (L1) acknowledgement (ACK) message based on the transmission of the plurality of UL signals, and transmit, to the base station, UL data via at least one preconfigured uplink resource (PUR) based on the received first L1 ACK message.

In one aspect, the plurality of UL signals may include one or more UL reference signals. The plurality of UL signals may include one or more sounding reference signals (SRS). In another aspect, the transmission of the plurality of UL signals and the transmission of the UL data via at least one PUR may be asynchronous. In another aspect, the first L1 ACK message may include at least one of a timing advance (TA) update or a configuration update for the at least one PUR. The plurality of UL signals may include a dedicated signal for the at least one PUR associated with an estimation of at least one of a UL TA or a UL channel status. The plurality of UL signals may be configured independently from the at least one PUR. The plurality of UL signals may be transmitted periodically or aperiodically.

The UE may receive a second L1 ACK message based on the transmission of the UL data via the at least one PUR, where the second L1 ACK message may be received from the base station at a second time delay associated with the transmission of the UL data via the at least one PUR In one aspect, the first L1 ACK message may be received at a time domain location based on the transmission of the UL data via the at least one PUR, where the time domain location corresponds to a scheduled reception of the second L1 ACK. In another aspect, the first L1 ACK message may be received at the second time delay associated with the transmission of the plurality of UL signals.

In another aspect, the first L1 ACK message may be received at a first time delay associated with the transmission of the UL data via the at least one PUR, where the first time delay is different from the second time delay. In another aspect, the plurality of UL signals may be independently configured, and the first L1 ACK message is received based on the independent configuration of the plurality of UL signals.

The UE may receive, from the base station, a PUR configuration for the at least one PUR, where the transmission of the UL data via the at least one PUR is based on the received PUR configuration. The PUR configuration may indicate at least one of an L1 ACK monitoring window, an L1 ACK density, or an L1 ACK density. The UE may receive a second L1 ACK message based on the transmission of the UL data via the at least one PUR, where the UE may receive one of the first L1 ACK message or the second L1 ACK message within the L1 ACK monitoring window.

The UE may determine that a time period between two L1 ACK messages scheduled adjacent to a first UL signal of the plurality of UL signals is less than a L1 ACK density. The UE may also determine that the first L1 ACK message of a first UL signal of the plurality of UL signals and the second L1 ACK message are scheduled for reception in the same L1 ACK monitoring window. The UE may determine to drop the transmission of the first UL signal based on one of the determination that the time period between two L1 ACK messages scheduled adjacent to the first UL signal of the plurality of UL signals is less than the L1 ACK density, or the determination that the first L1 ACK message of the first L1 ACK message and the second L1 ACK message are scheduled for reception in the same L1 ACK monitoring window.

The base station may determine that a time period between two L1 ACK messages scheduled adjacent to a first UL signal of the plurality of UL signals is less than a L1 ACK density. The base station may also determine that the first L1 ACK message of a first UL signal of the plurality of UL signals and the second L1 ACK message are scheduled for transmission in a same L1 ACK monitoring window. The base station may determine to omit the transmission of the first L1 ACK message in response to the first UL signal to the UE based on one of the determination that the first L1 ACK message and the second L1 ACK message are scheduled for transmission in the same L1 ACK monitoring window or the determination that the time period between two L1 ACK messages scheduled adjacent to the first UL signal of the plurality of UL signals is less than the L1 ACK density, where the PUR configuration indicates the L1 ACK density.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 13 is a flowchart of a method of wireless communication.

DETAILED DESCRIPTION

Figure 1:
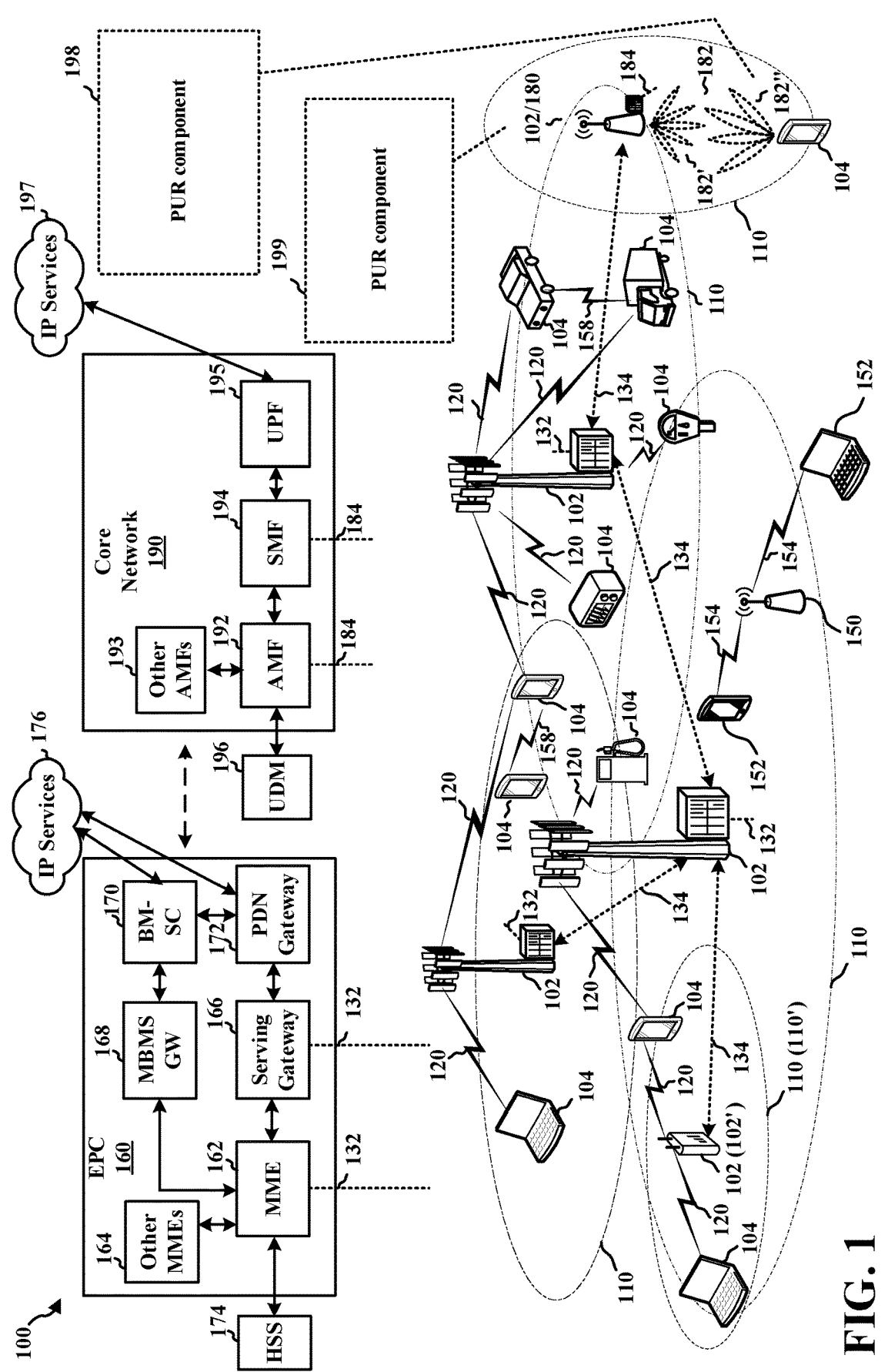
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE

104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a PUR component 198 configured to transmit, to the base station, a plurality of UL reference signals, the UE being in one of an RRC idle mode or an RRC inactive mode, receive, from the base station, a first L1 ACK message based on the transmission of the plurality of UL reference signals, and transmit, to the base station, UL data via at least one PUR based on the received first L1 ACK message. In certain aspects, the base station 180 may include a PUR component 199 configured to receive, from the UE in one of the RRC idle mode or an RRC inactive mode, the plurality of UL reference signals, transmit, to the UE, the first L1 ACK message based on the received plurality of UL reference signals, and receive, from the UE, UL data via at least one PUR based on the transmitted first L1 ACK message. Although the following description may be focused on 5G NR, the concepts described herein may be applicable to other similar areas, such as LTE, LTE-A, CDMA, GSM, and other wireless technologies.

Figures 2A, 2B, 2C, 2D:
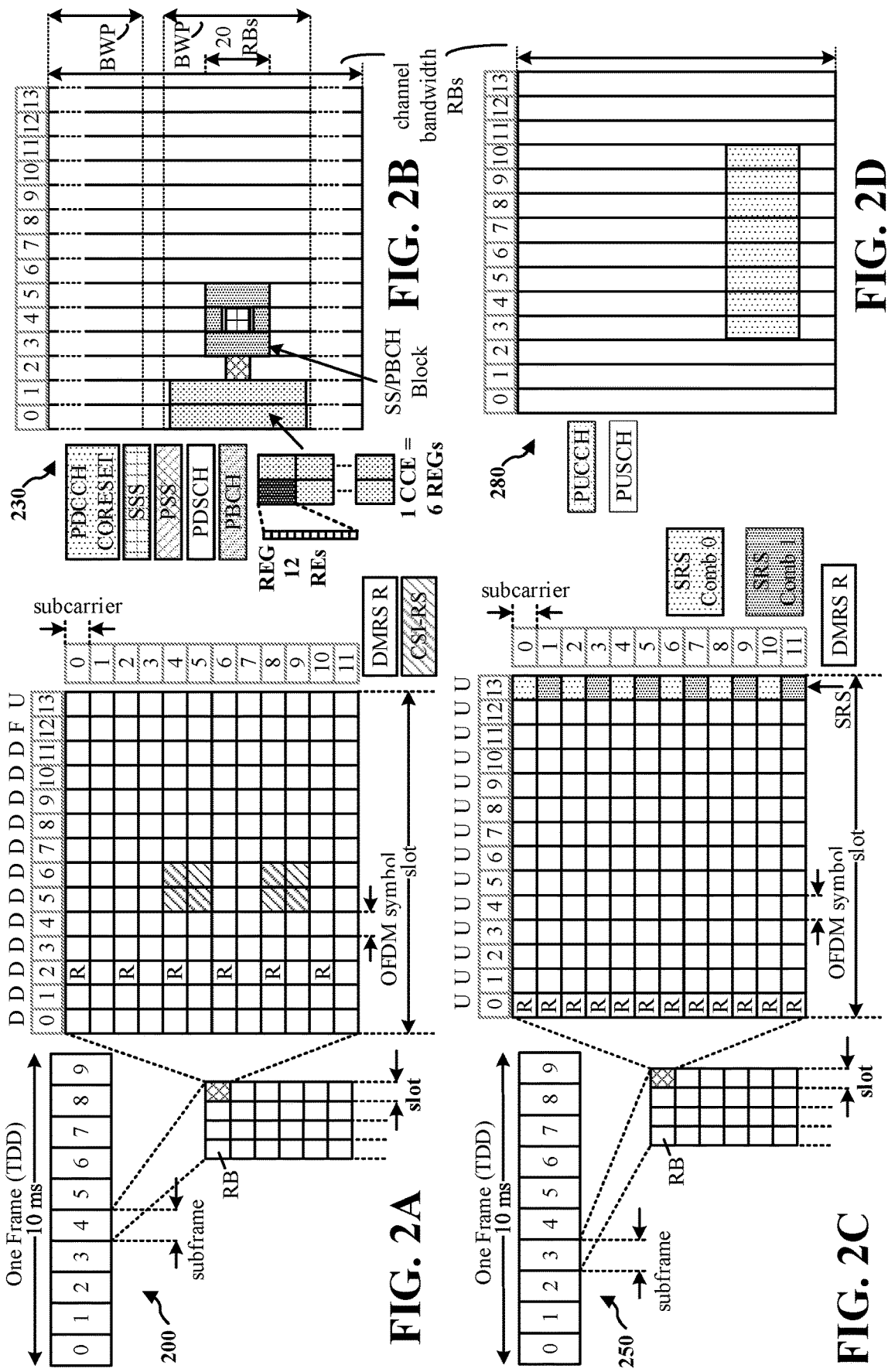
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2$^{11}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
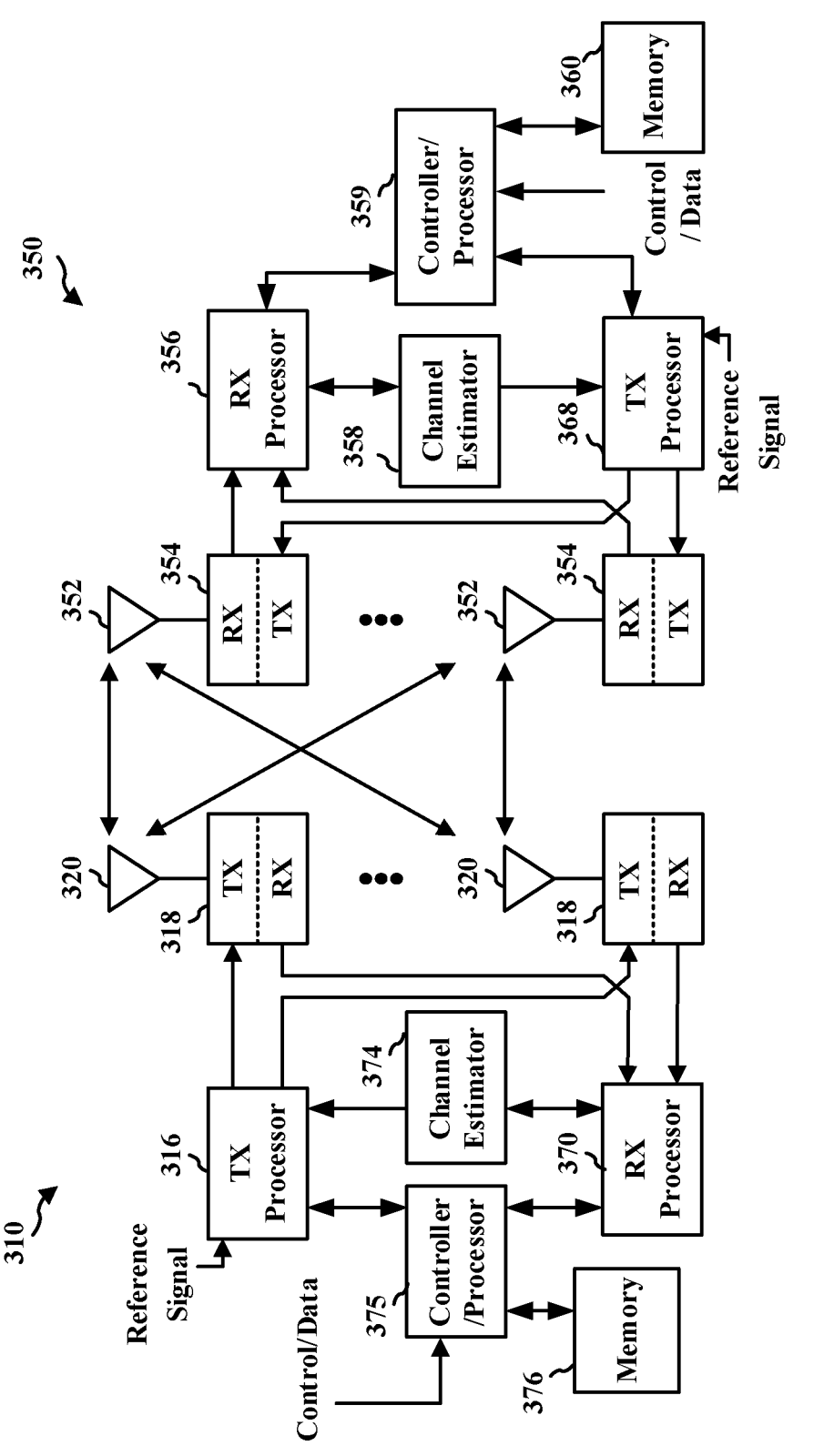
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, a UE may not transmit data when in an RRC idle mode or an RRC inactive mode if there is no RRC connection between the UE and network. A UE in RRC idle mode or RRC inactive mode may determine to transmit uplink (UL) data, and establish an RRC connection to transmit the UL data to the base station. That is, a UE in RRC idle mode or RRC inactive mode may establish an RRC connection with the network via a random access procedure with a base station of the network to transmit UL data to the base station. When a data packet size of the UL data transmission is relatively small, e.g., a sensor data, the signaling overhead and the additional power consumption from the random access procedure and the RRC connection establishment may be relatively significant compared to the data transmission operation itself. To address the signaling overhead and power consumption issue, various approaches may be provided.

In one aspect, an early data transmission (EDT) may be provided for the UE and the base station to address the issue of UL transmission in RRC idle/inactive mode. With the EDT, a UE in RRC idle/inactive mode may transmit UL data in a message 3 (Msg3) during the random access procedure before the RRC connection is fully set up. That is, the UE may initiate the random access procedure and after communicating a message 1 (Msg1) carrying random preamble and a message 2 (Msg2) carrying random access response, and the UE may then transmit the UL data in the Msg3 to the base station. Accordingly, through the EDT feature, the UE may transmit the UL data in the Msg3 to the base station before completing the random access procedure to establish the RRC connection between the UE and the base station.

In another aspect, a preconfigured uplink resource (PUR) may be provided for the UE and the base station to address the issue of UL transmission in RRC idle/inactive mode. With the PUR, the UE in RRC idle/inactive mode may directly transmit uplink data, which corresponds with the Msg3 of the EDT, to the network, and the network may confirm the reception of UL data with a PUR acknowledgement (ACK), which corresponds to a Msg4 of the EDT sent in downlink (DL) communication. That is, utilizing the PUR, data may be transmitted between the UE and the base station without communicating the Msg1 and the Msg2. The PUR may improve the efficiency of the UL transmission in RRC idle/inactive mode by omitting the Msg1 transmission and the Msg2. For example, the PUR may be implemented for a UE that may report small size sensor data over a certain time period, e.g., once every few seconds or tens of seconds, to a network. Accordingly, a PUR may reduce the power consumption of a UE in RRC idle/inactive mode by reducing the signaling overhead caused by the extra steps for connection establishment or UL synchronization (i.e., by Msg3 and Msg4). On the other hand, the PUR may have a restricted application to low mobility or stationary UEs. To accommodate the base station receiving UL transmissions from different UEs with synchronized timing without interfering with each other, the UE may consider a PUR valid for UL transmissions when certain time alignment validation rules are satisfied.

In one aspect, the UE may be in a same serving cell for PUR configuration and UL data transmission. The PUR resource configuration parameters may be provided by the network in an RRC release message to the UE. That is, the PUR may be configured by an RRC release message instructing the UE to enter RRC idle/inactive mode, and the UE may be within the same serving cell to transmit the message on the PUR based on the received RRC release message.

In another aspect, a UE's time alignment timer may not have expired. In another aspect, a DL reference signal received power (RSRP) change measured by the UE may not exceed a threshold. In another aspect, the UL timing may not change for the UE that circles around the base station and the RSRP change specification may not be configured for the UE.

Figure 4:
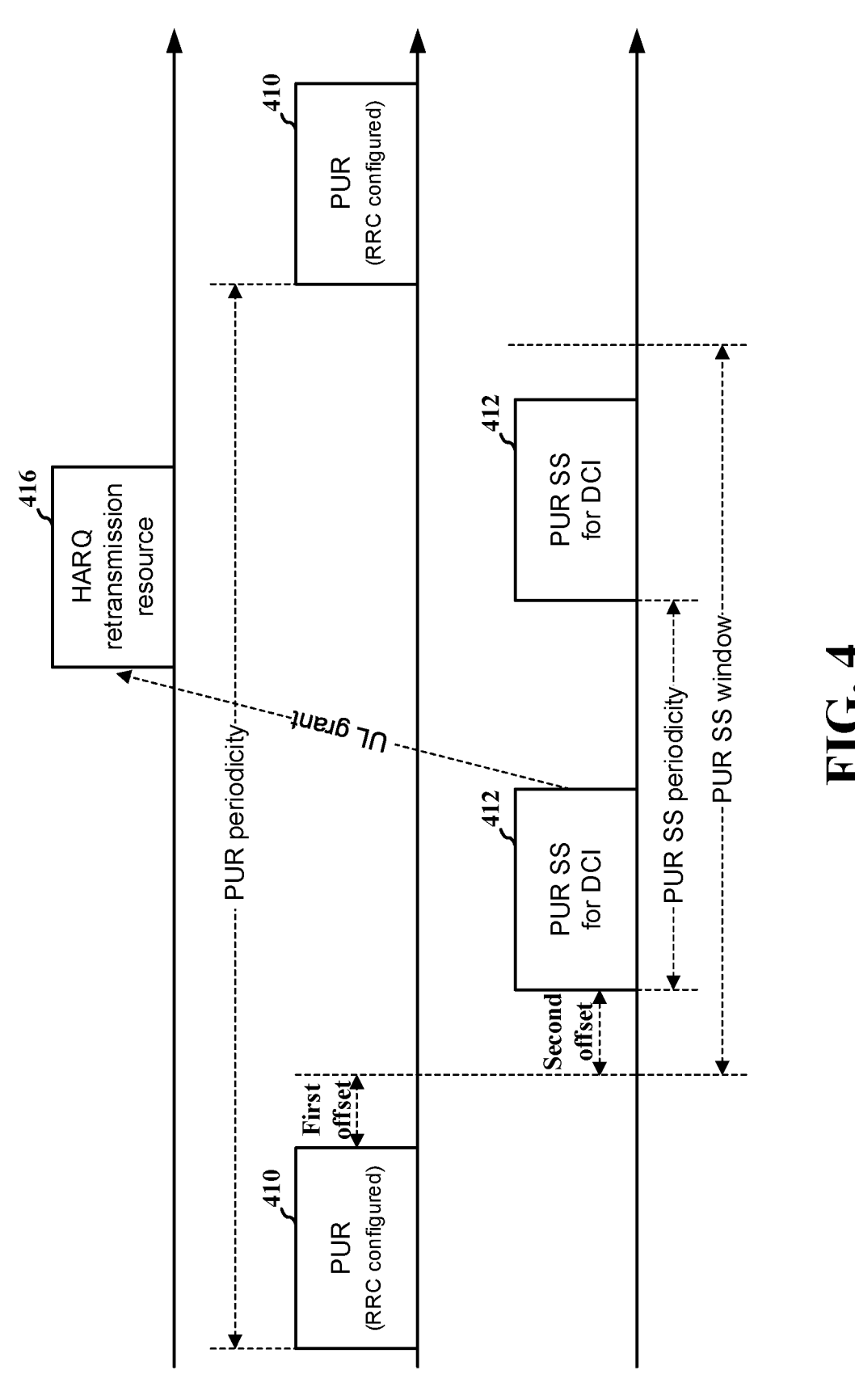
FIG. 4 is a diagram illustrating an example of a PUR operation of wireless communication.

FIG. 4 is a diagram 400 illustrating an example of a PUR operation of wireless communication. A UE may transmit UL data on the PUR 410 to a base station. The PUR 410 may be allocated based on PUR resource configuration parameters in an RRC message (e.g., RRC release message) received from the network. The PUR 410 may be configured with a PUR periodicity. The transmission of the UL data may be periodic based on the configured PUR periodicity, as well as be an aperiodic transmission. The scrambling of the PUR may be initialized with a PUR cell radio network temporary identifier (RNTI) (C-RNTI).

Based on the transmission of the UL data on the PUR 410, the UE may start monitoring for the PUR search space (SS) 412 within a PUR SS window, which may start at a first offset after transmitting the UL data on the PUR 410. For example, the first offset may be a set number of subframes (e.g., 3 subframes). The UE may receive a PUR response based on the PUR C-RNTI in the PUR SS 412 within the PUR SS window. The UE may search for the first PUR SS 412 at a second offset after the start of the PUR SS window. For example, the second offset may be a PDCCH offset. The PUR response may be received in a DCI transmitted by the base station in response to the transmission of the UL data on the PUR 410.

The base station may receive the PUR 410 from the UE, and the base station may transmit a PUR response to the UE. The base station may include a refined timing advance (TA) and/or an updated PUR configuration in the PUR response to the UE, which may help a mobile UE to maintain its UL synchronization during the entire operation time of UL data transmission on the PUR. The data transmission on the PUR 410 may act as a preamble that can be used by the base station to estimate a UE's UL channel delay and channel condition.

The PUR response may indicate a HARQ retransmission of the UL data that was transmitted on the PUR 410 and include a UL grant for retransmission of the UL data that was transmitted on the PUR 410. The UL grant for the retransmission of the UL data may indicate HARQ response resources 416 for the retransmission of the UL data. The UE may retransmit the data that was transmitted on the PUR 410 on the HARQ response resources 416 to the base station in response to the PUR response received from the base station. The scrambling of the retransmission of the UL data on the HARQ retransmission resources 416 may be initiated with the PUR C-RNTI.

The PUR response may indicate a PUR data link (L2)/ network layer (L3) ACK. The PUR response may schedule a PDSCH containing the L2/L3 ACK. The UE may respond to the PUR L2/L3 ACK using the RRC-configured PUCCH resources.

A UE may receive a PUR physical layer (L1) ACK/ fallback. That is, the PUR response may indicate an L1 ACK of the UL data transmission on the PUR 410 or a fallback indication instructing the UE to fallback to another procedure, such as the EDT or the random access procedure. The L1 ACK may update parameters for subsequent PUR transmissions, such as the TA or a repetition number. The UE may stop monitoring for the PUR SS in the PUR SS window based on receiving the PUR L1 ACK from the base station.

A UE may also detect a lack of response received within the PUR SS window, and the UE may determine to fallback to another procedure, such as the EDT or the random access procedure.

A UE in RRC idle/inactive mode may consistently obtain the L1 ACK from the base station to receive the TA adjustment to maintain the UL timing synchronization. In one aspect, the application of the PUR to transmit a periodic UL data transmission may provide the consistent transmission of the L1 ACK.

In another aspect, the aperiodic data transmission on the PUR may not provide a periodic PUR configuration update on the L1 ACK. For example, the UE may not transmit sensor data to a network if the data does not change much.

That is, a UE may aperiodically send data to the network based on a non-uniform sampling. Accordingly, some UL transmissions may be maintained in a periodic manner to maintain the UL data transmission on the PUR.

In some aspects, another UL transmission operation may be independently configured for a UE in RRC idle/inactive mode for other applications such as UL-based UE positioning. That is, a UE in RRC idle/inactive mode may be configured with a UL transmission configured separately from the PUR. In some aspects, a UE in RRC idle/inactive mode may be configured with the independent UL transmission operations that may be configured in RRC connected mode, such as positioning, CSI-RS/TRS reception, etc.

The current disclosure provides a joint operation of the UL data transmission on the PUR and the separate UL transmissions for a UE in idle/inactive mode.

Figure 5:
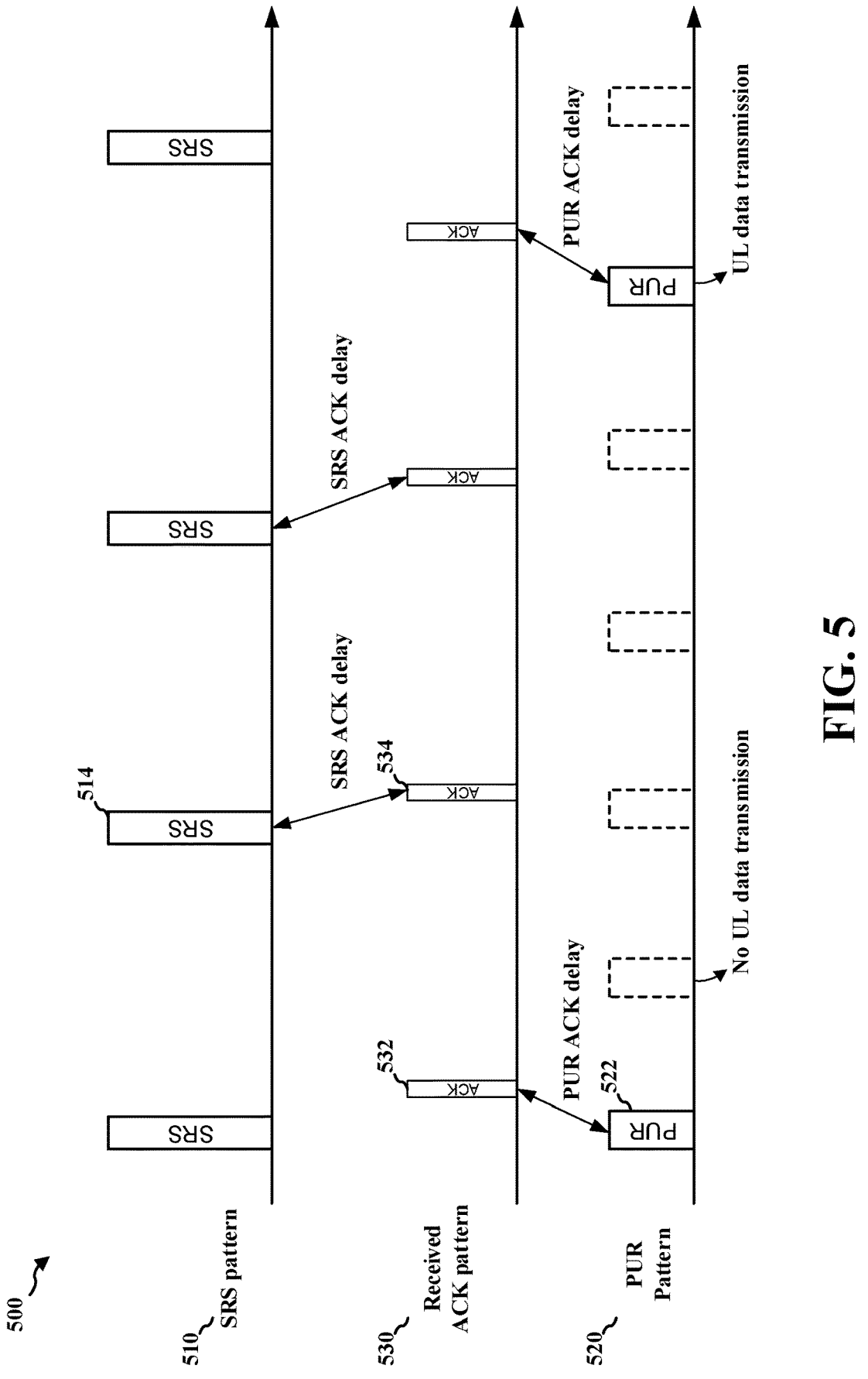
FIG. 5 is a diagram illustrating an example of a method of wireless communication.

FIG. 5 is a diagram 500 illustrating an example of a method of wireless communication. The diagram 500 may include an SRS pattern 510 transmitted by a UE, a PUR pattern 520 transmitted by the UE, and an ACK pattern 530 received by the UE. The diagram 500 may indicate the SRS as an example of another UL transmission to assist the UL transmission using a PUR for a UE in idle/inactive mode. However, embodiments of the current disclosure are not necessarily limited thereto, and another UL transmission may include any form of UL transmission that may be configured for a UE in idle/inactive mode. For example, the UL transmission may include one or more UL reference signals.

In some aspects, the network may transmit the L1 ACK in the PUR response to the UE after the SRS transmission even though UL data is not transmitted on the PUR. The L1 ACK may include a TA update and/or a PUR configuration update to the UE. That is, the UE may transmit UL data transmissions according to the PUR pattern 520 and/or the SRS pattern 510 and receive the L1 ACK on the ACK pattern 530 based on the UL data transmissions on the PUR pattern 520 and/or the SRS patterns 510. The PUR pattern 520 may include the first PUR 522 for transmitting the UL data transmission. Based on the UL data transmission of the first PUR 522, the UE may receive a first PUR ACK 532 after a PUR ACK delay.

For example, after transmitting the UL data using the PUR, a MAC entity of the UE may monitor for the PDCCH identified by PUR-RNTI in the PUR response window using a timer (e.g., pur-Response Window Timer), which may start at the subframe that contains the end of the corresponding PUSCH transmission plus four (4) subframes, for a length of time (e.g., pur-ResponseWindowSize).

In some aspects, the UE may also transmit the SRS 514 when no UL data is transmitted on the PUR pattern 520 and receive a second PUR ACK 534 based on the transmitted SRS 514 after an SRS ACK delay. In some aspects, the SRS transmission may be synchronized with the PUR. The network may transmit, through the base station, the L1 ACK in the PUR response to the UE based on the SRS transmission even though the UL data may not be transmitted on the PUR. In one aspect, the SRS transmission may be enabled with the L1 ACK for the PUR response. In another aspect, the SRS L1 ACK may be available when there is no L1 ACK message scheduled for a UL data transmission using the PUR. In some aspects, the L1 ACK may include a TA update and a PUR configuration update for the UE.

Figure 6:
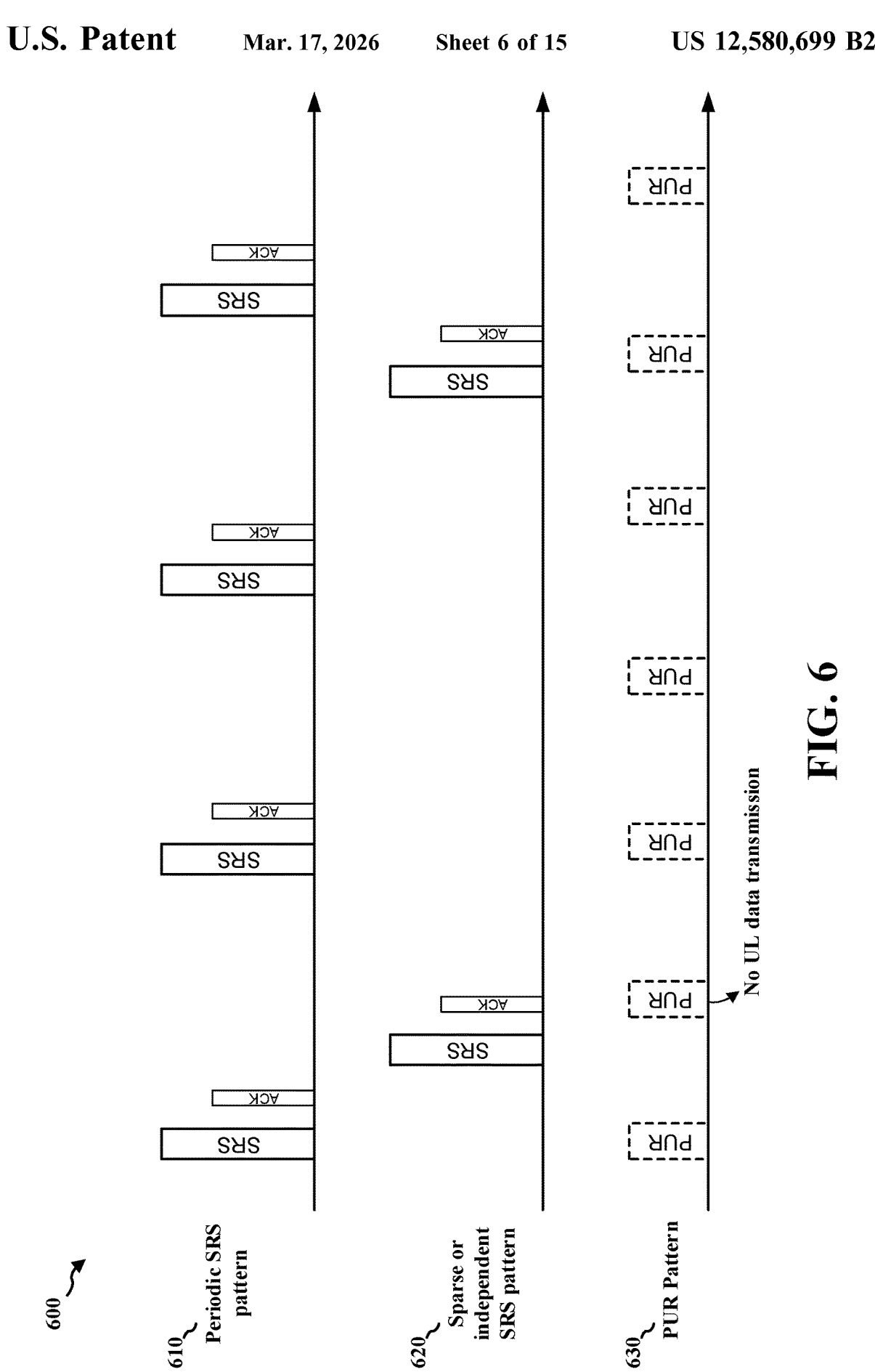
FIG. 6 is a diagram illustrating an example of a method of wireless communication.

FIG. 6 is a diagram 600 illustrating an example of a method of wireless communication. Based on the diagram 600, the SRS transmission may illustrate a first SRS pattern 610 including a periodic SRS pattern and a second SRS pattern 620 including a sparse or independent SRS pattern, and a PUR pattern 630.

In some aspects, the SRS may be a dedicated transmitted SRS to assist the PUR. That is, the SRS may be configured as a dedicated UL transmission to assist the PUR. The SRS may be transmitted to the base station, and the base station may estimate the UE's UL timing and UL channel based on the SRS received from the UE. In one aspect, the SRS may be transmitted when the UL data transmission is omitted on several consecutive PUR occasions, and the base station may blindly detect the SRS transmission from the UE. In another aspect, the UE may periodically (e.g., in a relatively large periodicity) transmit the SRS to maintain reduced efforts for UL timing synchronization. That is, the UE may be configured to periodically transmit the SRS to the base station to maintain the UL timing synchronization. The SRS transmission may be configured with a periodicity relatively larger than the periodicity for the PUR patterns 630 to accommodate the UL timing synchronization for the PUR while reducing the signaling overhead.

In some aspects, the SRS may be an independently configured SRS, e.g., for the UL-based positioning in RRC idle/inactive mode. For example, the SRS for UL-based positioning may provide a better timing resolution than the demodulation reference signal (DMRS) of the UL channel. The UE and the base station may use the independently configured SRS to maintain the UL timing synchronization for the PUR. In some aspects, the SRS may be configured with a periodic pattern or a sparse/independent pattern, which may also be aperiodic.

Figure 7:
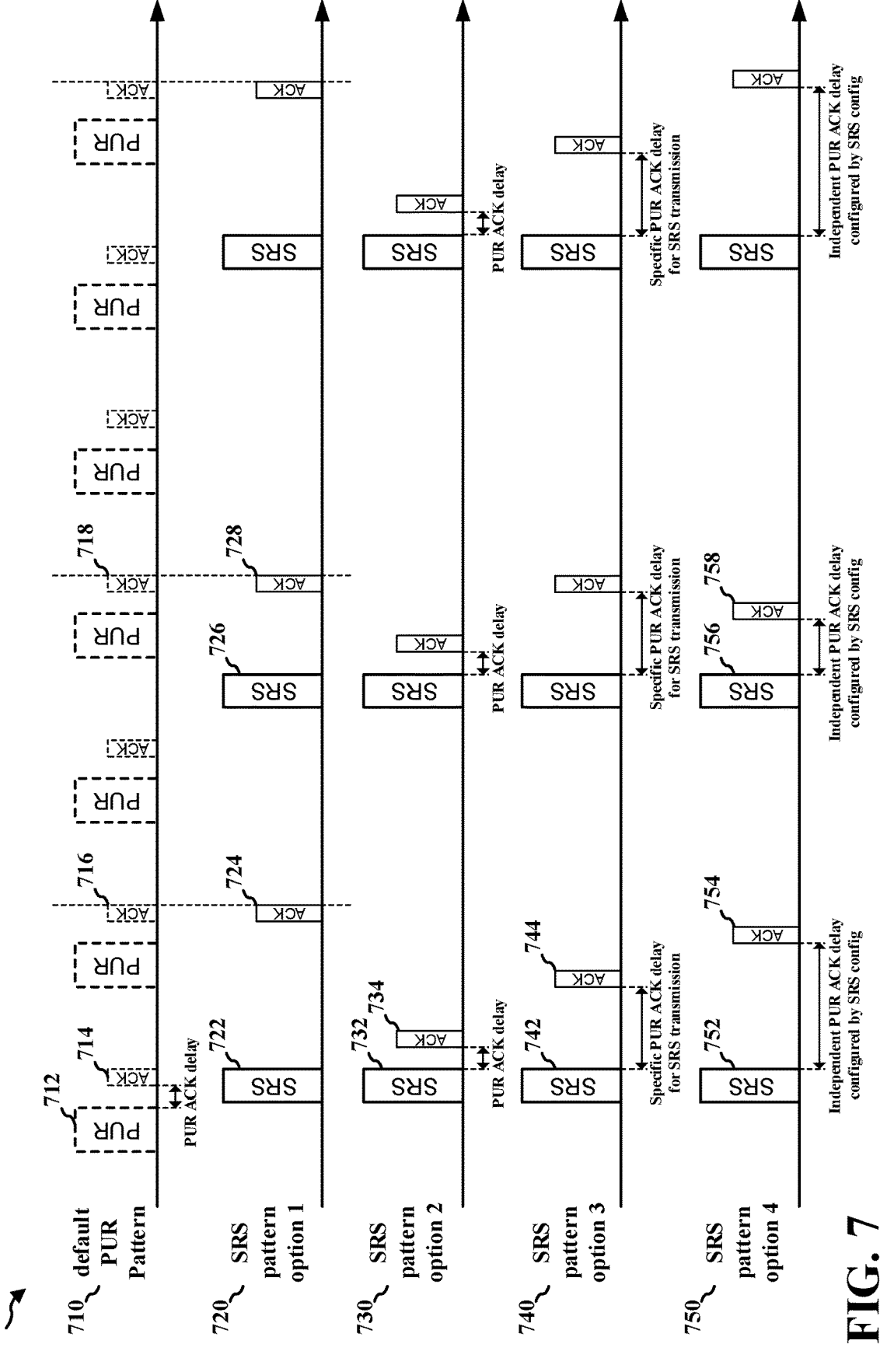
FIG. 7 is a diagram illustrating an example of a method of wireless communication.

FIG. 7 is a diagram 700 illustrating an example of a method of wireless communication. The diagram may include a default PUR pattern 710 and a first option of SRS pattern 720, a second option of SRS pattern 730, a third option of SRS pattern 740, and a fourth option of SRS pattern 750. The first option of SRS pattern 720, the second option of SRS pattern 730, the third option of SRS pattern 740, and the fourth option of SRS pattern 740 may have the same patterns for the SRS transmission, and may have a different schedule for receiving the L1 ACKs from the base station.

Referring to the default PUR pattern 710, the UE may be configured to transmit the PUR 712 and expect to receive the L1 ACK 714 at a PUR ACK delay. For example, the PUR ACK delay may be four subframes+one PDCCH offset to monitor the corresponding L1 ACK.

Referring to the first option of SRS pattern 720, the L1 ACK for the SRS transmission may be received at the default ACK position for the UL data transmission using the PUR. The time offset may meet the SRS processing time delay in the base station and the propagation delay. That is, in response to transmitting the SRS 722 to the base station, the UE may be configured to receive the ACK 724 at a time-domain location corresponding to the subsequently scheduled ACK 716 according to the default PUR pattern 710. Also, the UE, in response to transmitting the SRS 726 to the base station, may be configured to receive the ACK 728 at a time-domain location corresponding to the subsequently scheduled ACK 718 according to the default PUR pattern 710.

Referring to the second option of SRS pattern 730, the L1 ACK for the SRS may be configured to directly leverage the same configuration of the L1 ACK for the UL data transmission using the PUR.

That is, in response to transmitting the SRS 732 to the base station, the UE may be configured to receive the ACK

734 at a time delay equal to the PUR ACK delay configured for the default PUR pattern 710. The UE may, in response to transmitting the SRS 732 to the base station, be configured to receive the ACK 734 at a time delay equal to the PUR ACK delay configured for the default PUR pattern 710. For example, the PUR ACK delay may include four subframes and one PDCCH offset.

Referring to the third option of SRS pattern 740, the L1 ACK for the SRS may be configured with a specific offset. That is, the transmission and the reception of the L1 ACK may be configured with a specific offset, a specific PUR ACK delay, for the SRS transmissions. The specific PUR ACK may be configured differently from the PUR ACK delay configured for the default PUR pattern 710. The UE may, in response to transmitting the SRS 742 to the base station, be configured to receive the ACK 744 at the specific PUR ACK delay configured for the SRS transmission. The UE may, in response to transmitting the SRS 742 to the base station, be configured to receive the ACK 744 at the specific PUR ACK delay configured for the SRS transmission. Here, the UE and the base station may be configured with the same specific PUR ACK delay for each of the PUR ACKs of the SRS transmissions. For example, the specific PUR ACK delay may include two subframes and one PDCCH offset.

Referring to the fourth option of SRS pattern 750, the SRS may be independently configured (e.g., UL based positioning SRS), and the ACK may be related to the configuration of the independently configured SRS (e.g., related to the positioning SRS ACK configuration).

That is, the UE may transmit the SRS 752, which is independently configured, and receive the ACK 754 at a first independent PUR ACK delay based on the independent configuration of the SRS 752. Also, the UE may transmit the independently configured SRS 756 and receive the ACK 758 at a second independent PUR ACK delay based on the independent configuration of the SRS 756. The first independent PUR ACK delay and the second independent PUR ACK delay may be different from each other. For example, the time domain location may be related to the SRS configuration for positioning.

Figure 8:
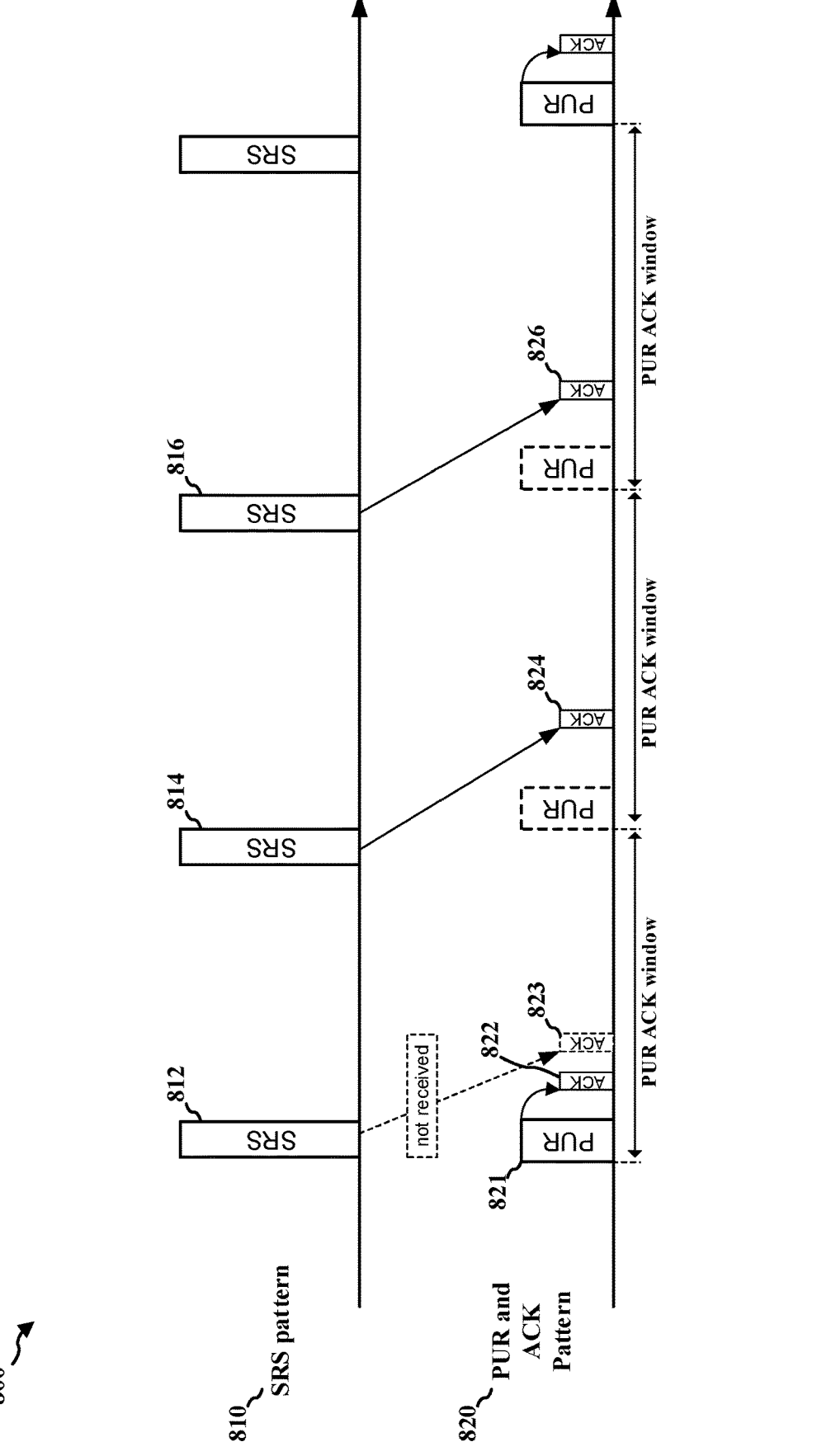
FIG. 8 is a diagram illustrating an example of a method of wireless communication.

FIG. 8 is a diagram 800 illustrating an example of a method of wireless communication. The diagram 800 may include an SRS pattern 810 and a PUR and ACK pattern 820 to illustrate the reception of the ACK based on the schedule of the PUR and the SRS. The L1 ACK based on the SRS transmission may be available when there is no colliding L1 ACK based on the UL data transmission using the PUR. Accordingly, the UE may track the TA of UL transmissions using the PUR while reducing the UE reception cost.

In some aspects, the base station and the UE may be configured with two L1 PUR ACKs, including a first L1 PUR ACK based on the UL data transmission using the PUR and a second L1 PUR ACK based on the SRS configuration. Here, the collision may refer to a situation when the L1 ACK for the SRS transmission and the L1 ACK for the UL data transmission using the PUR are scheduled to arrive at the same PUR ACK window. Among the two L1 ACKs in the same window, the L1 ACK for the data transmission using the PUR may have a relatively high priority, and the SRS L1 ACK may not be configured in the window with the L1 ACK for the data transmission using the PUR.

In some aspects, the network may define an L1 ACK monitoring window, and in each of the L1 ACK monitoring window, one L1 PUR ACK may be received. In one aspect, the window may be the time cycle of the PUR resource. In another aspect, the window may correspond to a parameter received from the base station (e.g., pur-ResponseWindow-Size).

Second, the network including the base station may set whether the SRS is configured with the L1 ACK or not. The L1 ACK for the data transmission using the PUR may be configured with a relatively high priority, and each of the L1 ACKs based on the UL data transmission on the PUR may be received from the base station. Finally, based on the configurations of the SRS and the PUR, the UE may determine or understand where and when to receive the L1 ACK from the base station.

Here, the network may define the L1 ACK monitoring window and indicate the PUR configuration including the defined L1 ACK monitoring window to the UE. The UE may transmit the first SRS 812 and the UL data transmission on the PUR 821 to the base station. The base station may determine that the L1 ACK 822 based on the PUR 821 and the L1 ACK 823 based on the first SRS 812 are scheduled in the same PUR ACK window and determine to transmit the L1 ACK 822 based on the PUR 821 and drop the L1 ACK 823 based on the first SRS 812. The UE may also determine that the L1 ACK 822 based on the PUR 821 and the L1 ACK 823 based on the first SRS 812 are scheduled in the same PUR ACK window and determine to receive the L1 ACK 822 based on the PUR 821 and/or not expect to receive the L1 ACK 823 based on the first SRS 812.

The UE may transmit a second SRS 814 and a third SRS 816 to the base station, without any PUR transmitted to the base station. The base station may determine that there is no colliding L1 ACK scheduled based on the PUR and transmit the L1 ACKs 824 and 826 to the UE based on the second SRS 814 and the third SRS 816. The UE may also determine to receive the L1 ACKs 824 and 826 from the base station based on the second SRS 814 and the third SRS 816.

Figure 9:
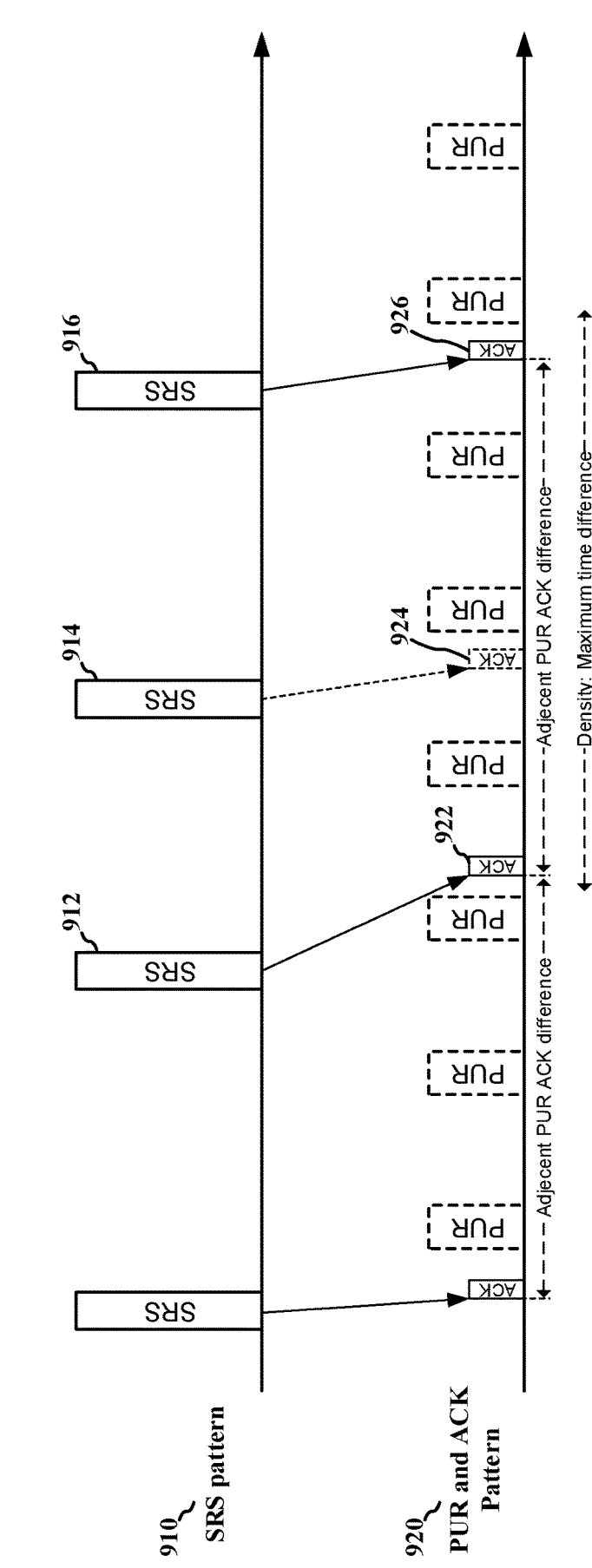
FIG. 9 is a diagram illustrating an example of a method of wireless communication.

FIG. 9 is a diagram 900 illustrating an example of a method of wireless communication. The diagram 900 may include an SRS pattern 910 and a PUR and ACK pattern 920 to illustrate the reception of the ACK based on the schedule of the SRS. In some aspects, not every SRS transmission may be configured with the transmission and the reception of the L1 PUR ACK. In one aspect, the L1 ACK may be transmitted with a downsampled periodicity of the SRS periodicity. For example, the L1 ACK with the downsampled periodicity of the SRS periodicity may be implemented for the SRS for UL positioning because the SRS for the UL positioning may have a higher timing accuracy specification than the UL TA accuracy for UL data transmission on the PUR. Accordingly, the PU of the base station and the UE may have improved TA tracking of the PUR while further reducing the UE reception cost.

In some aspects, the network may define one L1 ACK density. The L1 ACK density may refer to the maximum time difference between two adjacent L1 ACKs. Second, as long as the time difference between two adjacent L1 ACKs is less than the L1 ACK density, the transmission and the reception of the L1 ACK may be omitted. That is, for the transmission and reception of some SRS, if the density is met, the SRS may not trigger the L1 ACK, and as long as the time difference between two L1 ACKs is less than the L1 ACK density, other L1 ACKs in between the two L1 ACKs may be omitted. Finally, based on the L1 ACK density and its implementation, the base station may determine to omit at least one L1 ACK based on the SRS transmission, and the UE may not expect to receive at least one L1 ACK based on the SRS transmission.

Here, a network may define the L1 ACK monitoring window and the L1 ACK density and indicate the PUR configuration, including the defined L1 ACK monitoring window and the L1 ACK density to the UE. The UE may transmit a second SRS 912, a third SRS 914, and a fourth SRS 916 to the base station. The base station may determine that, among the second L1 ACK 922, the third L1 ACK 924, and the fourth L1 ACK 926 each scheduled for the second SRS 912, the third SRS 914, and the fourth SRS 916 received from the UE, a time difference between the second L1 ACK 922 and the fourth L1 ACK 926 is less than the L1 ACK density defined by the base station. The base station may, based on the determination that the time difference between the second L1 ACK 922 and the fourth L1 ACK 926 is less than the L1 ACK density, determine to omit the third L1 ACK 924. The UE may also determine that, among the second L1 ACK 922, the third L1 ACK 924, and the fourth L1 ACK 926 each scheduled for the second SRS 912, the third SRS 914, and the fourth SRS 916 transmitted to the base station, the time difference between the second L1 ACK 922 and the fourth L1 ACK 926 is less than the L1 ACK density defined by the base station. The base station may, based on the determination that the time difference between the second L1 ACK 922 and the fourth L1 ACK 926 is less than the L1 ACK density, determine not to receive the third L1 ACK 924.

Figure 10:
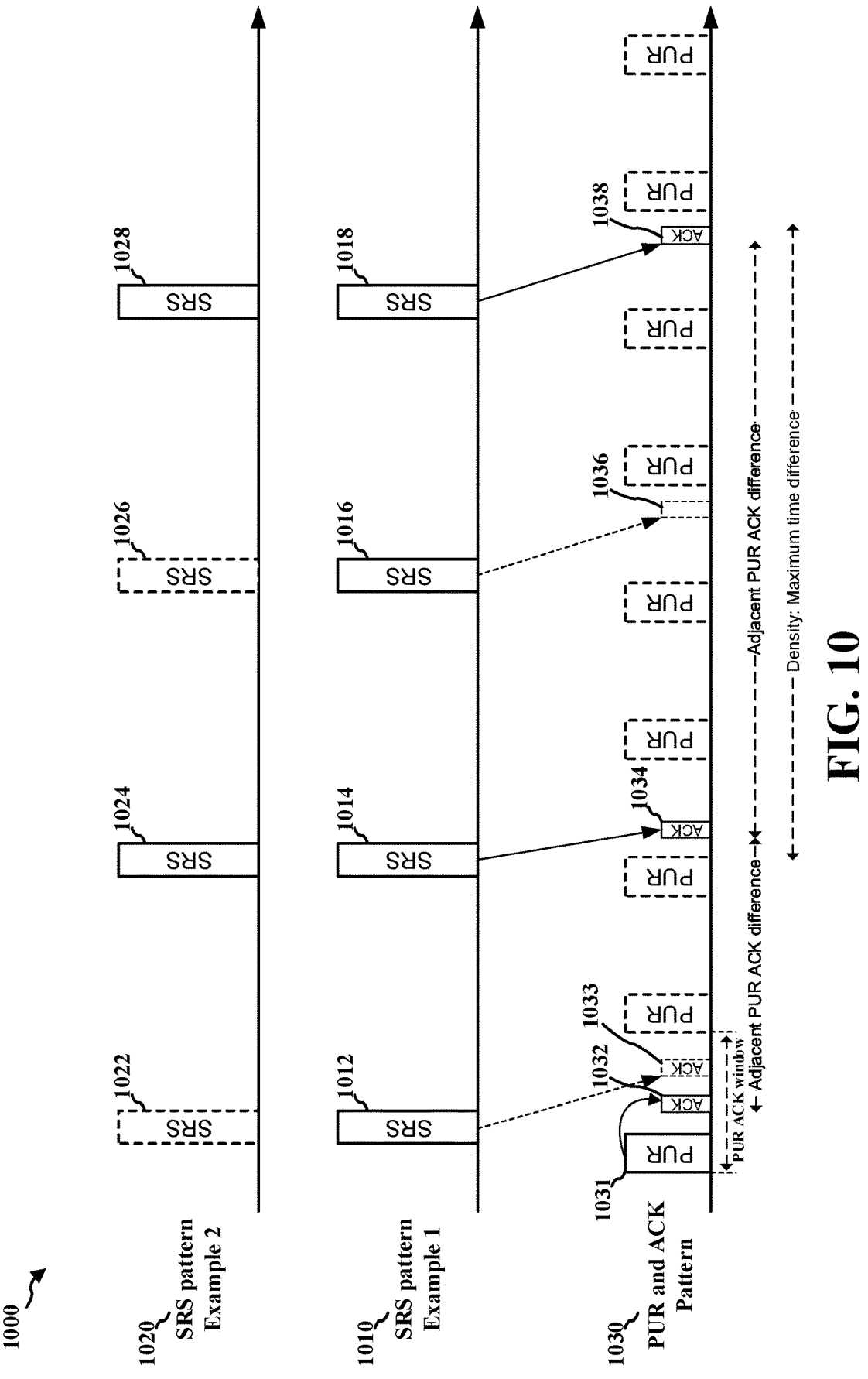
FIG. 10 is a diagram illustrating an example of a method of wireless communication.

FIG. 10 is a diagram 1000 illustrating an example of a method of wireless communication. The diagram 1000 may include a first example of SRS pattern 1010, a second example of SRS pattern 1020, and a PUR and ACK pattern 1030 to illustrate the reception of the ACK based on the schedule of the SRS. In some aspects, not every SRS transmission may be configured with the transmission and the reception of the L1 PUR ACK. That is, for some SRS transmissions, the L1 PUR ACK may be omitted. The network may define the L1 ACK monitoring window and the L1 ACK density and indicate the PUR configuration, including the defined L1 ACK monitoring window and the L1 ACK density to the UE.

In one aspect, the SRS may be transmitted based on the configured pattern of SRS, but some of the SRS may not be configured without the L1 PUR ACK. For example, if UL data is transmitted using the PUR, the base station may determine not to transmit the SRS within symbols where the UL data is transmitted using the PUR or within a time window after the PUR data transmission.

Referring to the first example of SRS pattern 1010, the UE may transmit the first SRS 1012 and the UL data transmission on the PUR 1031 to the base station. The base station may determine that the L1 ACK 1032 based on the PUR 1031 and the L1 ACK 1033 based on the first SRS 1012 are scheduled in the same PUR ACK window and determine to transmit the L1 ACK 1032 based on the PUR 1031 and drop the L1 ACK 1033 based on the first SRS 1012. The UE may also determine that the L1 ACK 1032 based on the PUR 1031 and the L1 ACK 1033 based on the first SRS 1012 are scheduled in the same PUR ACK window and determine to receive the L1 ACK 1032 based on the PUR 1031 and not expect to receive the L1 ACK 1033 based on the first SRS 1012.

The UE may transmit a second SRS 1014, a third SRS 1016, and a fourth SRS 1018 to the base station. The base station may determine that among the second L1 ACK 1034, the third L1 ACK 1036, and the fourth L1 ACK 1038 each scheduled for the second SRS 1014, the third SRS 1016, and the fourth SRS 1018 received from the UE, a time difference between the second L1 ACK 1034 and the fourth L1 ACK

1038 is less than the L1 ACK density defined by the base station. The base station may, based on the determination that the time difference between the second L1 ACK 1034 and the fourth L1 ACK 1038 is less than the L1 ACK density, determine to omit the third L1 ACK 1036. The UE may also determine that, among the second L1 ACK 1034, the third L1 ACK 1036, and the fourth L1 ACK 1038 each scheduled for the second SRS 1014, the third SRS 1016, and the fourth SRS 1018 transmitted to the base station, the time difference between the second L1 ACK 1034 and the fourth L1 ACK 1038 is less than the L1 ACK density defined by the base station. The base station may, based on the determination that the time difference between the second L1 ACK 1034 and the fourth L1 ACK 1038 is less than the L1 ACK density, determine not to receive the third L1 ACK 1036. In another aspect, among the SRSs configured based on the pattern of SRS, the base station and the UE may be configured to omit the transmission of at least one SRS that may not be configured with the L1 PUR ACK.

Referring to the second example of SRS pattern 1020, the UE may transmit the UL data on the PUR 1031 to the base station, and accordingly, determine to omit the transmission of the first SRS 1022 that collides with the UL data transmission on the PUR 1031. The base station may receive the PUR 1031 from the UE and determine that the L1 ACK 1032 based on the PUR 1031 may collide with an L1 ACK 1033 based on the first SRS 1022. The base station may determine that the first SRS 1022 may not be received from the UE. The first SRS 1022 may be omitted, and therefore, the base station may omit the L1 ACK 1033 based on the first SRS 1022, and the UE may determine or understand that the L1 ACK 1033 may not be received from the base station.

The UE may be scheduled with transmissions of a second SRS 1024, a third SRS 1026, and a fourth SRS 1028 to the base station. The UE may determine that, among the second L1 ACK 1034, the third L1 ACK 1036, and the fourth L1 ACK 1038 for the scheduled second SRS 1024, third SRS 1026, and fourth SRS 1028, a time difference between the second L1 ACK 1034 and the fourth L1 ACK 1038 is less than the L1 ACK density defined by the base station. The UE may, based on the determination that the time difference between the second L1 ACK 1034 and the fourth L1 ACK 1038 is less than the L1 ACK density, determine to omit the third SRS 1026. Accordingly, the base station may not receive the omitted third SRS 1026 from the UE, and may not transmit the third L1 ACK 1036 to the UE.

Figure 11:
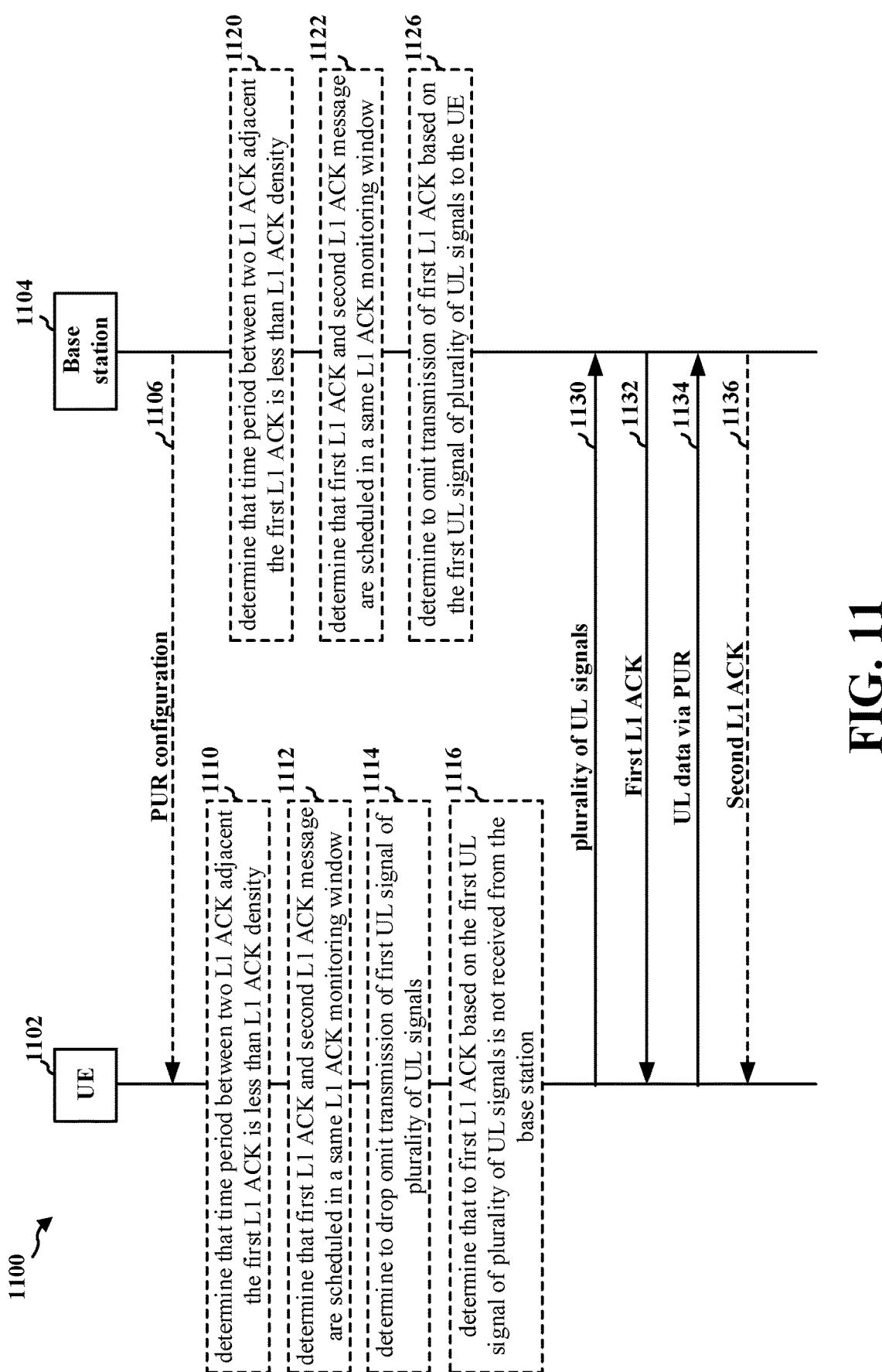
FIG. 11 illustrates a communication chart of wireless communication.

FIG. 11 illustrates a communication chart 1100 of wireless communication. The communication chart 1100 may include a UE 1102 and a base station 1104.

At 1106, the base station may transmit a PUR configuration for the at least one PUR to a UE, and the UE may receive the PUR configuration for the at least one PUR from the base station. The PUR configuration may indicate an L1 ACK monitoring window and/or an L1 ACK density. Based on the PUR configuration communicated from the base station, the UE may transmit the UL data via the PUR at 1134. The PUR configuration may indicate a time domain location at which a first L1 ACK message is communicated at 1132 based on the transmission of the UL data via the at least one PUR and a second time delay at which a second L1 ACK message is communicated at 1136 based on the transmission of the UL data via the at least one PUR. For example, the second time delay may be a PUR ACK delay.

At 1110, the UE may determine that a time period between two L1 ACK messages scheduled adjacent to a first UL signal of the plurality of UL signals is less than the L1

ACK density indicated by the PUR configuration received from the base station at 1106.

At 1112, the UE may determine that the first L1 ACK message of a first UL signal of the plurality of UL signals and the second L1 ACK message are scheduled for reception in a same L1 ACK monitoring window.

At 1114, the UE may determine to drop the transmission of the first UL signal based on at least one of the determination that the time period between two L1 ACK messages scheduled adjacent to the first UL signal of the plurality of UL signals is less than the L1 ACK density at 1110 or the determination that the first L1 ACK message and the second L1 ACK message are scheduled for a reception in the same L1 ACK monitoring window at 1112.

At 1116, the UE may determine that the first L1 ACK message in response to the first UL signal is not received from the base station based on at least one of the determination that the time period between two L1 ACK messages scheduled adjacent to the first UL signal of the plurality of UL signals is less than the L1 ACK density at 1110 or the determination that the first L1 ACK message and the second L1 ACK message are scheduled for a reception in the same L1 ACK monitoring window at 1112.

At 1120, the base station may determine that a time period between two L1 ACK messages scheduled adjacent to a first UL signal of the plurality of UL signals is less than the L1 ACK density.

At 1122, the base station may determine that the first L1 ACK message of the first UL signal of the plurality of UL signals and the second L1 ACK message are scheduled for transmission in the same L1 ACK monitoring window.

At 1126, the base station may determine to omit the transmission of the first L1 ACK message in response to the first UL signal to the UE based on at least one of the determination that the time period between two L1 ACK messages scheduled adjacent to the first UL signal of the plurality of UL signals is less than the L1 ACK density at 1120, or the determination that the first L1 ACK message and the second L1 ACK message are scheduled for transmission in the same L1 ACK monitoring window at 1122.

At 1130, the UE may transmit, to the base station, a plurality of UL signals, the UE being in one of an RRC idle mode or an RRC inactive mode, and the base station may receive, from a UE in one of the RRC idle mode or the RRC inactive mode, a plurality of UL signals. The plurality of UL signals may include one or more UL reference signals. In one aspect, the plurality of UL signals may include one or more SRS. In one aspect, the plurality of UL signals may include a dedicated signal for the at least one PUR associated with an estimation of at least one of a UL TA or a UL channel status. In another aspect, the plurality of UL signals may be configured independently from at least one PUR In another aspect, the plurality of UL signals may be transmitted periodically or aperiodically.

At 1132, the base station may transmit, to the UE, the first L1 ACK message based on the plurality of UL signals received at 1130, and the UE may receive, from the base station, the first L1 ACK message. The first L1 ACK message may include at least one of a TA update or a configuration update for the at least one PUR The first L1 ACK message may be communicated at a time-domain location based on the transmission of the UL data via at least one PUR In one aspect, the first L1 ACK message may be communicated at the time domain location based on the transmission of the UL data via at least one PUR, the time domain location corresponding to the scheduled reception of the second L1 ACK. In another aspect, the first L1 ACK message may be communicated at the second time delay associated with the transmission of the plurality of UL signals. In another aspect, the first L1 ACK message may be communicated at a first time delay associated with the transmission of the UL data via at least one PUR, where the first time delay is different from the second time delay. For example, the first time delay may be a specific PUR ACK delay for the plurality of UL signals. In another aspect, the plurality of UL signals may be independently configured, and the first L1 ACK message may be communicated based on the independent configuration of the plurality of UL signals.

At 1134, the UE may transmit, to the base station, UL data via at least one PUR based on the received first L1 ACK message at 1132, and the base station may receive, from the UE, the UL data via at least one PUR The transmission of the plurality of UL signals and the transmission of the UL data via the at least one PUR may be asynchronous. In one aspect, the transmission of the UL data via the at least one PUR may be based on the PUR configuration communicated at 1106.

At 1136, the base station may transmit the second L1 ACK message based on the reception of the UL data via the at least one PUR at 1134, and the UE may receive the second L1 ACK message based on the transmission of the UL data via the at least one PUR at 1134. The second L1 ACK message may be communicated from the base station at the second time delay associated with the transmission of the UL data via the at least one PUR. In one aspect, the UE and the base station may communicate one of the first L1 ACK message or the second L1 ACK message within the L1 ACK monitoring window, based on the PUR configuration communicated at 1106.

Figure 12:
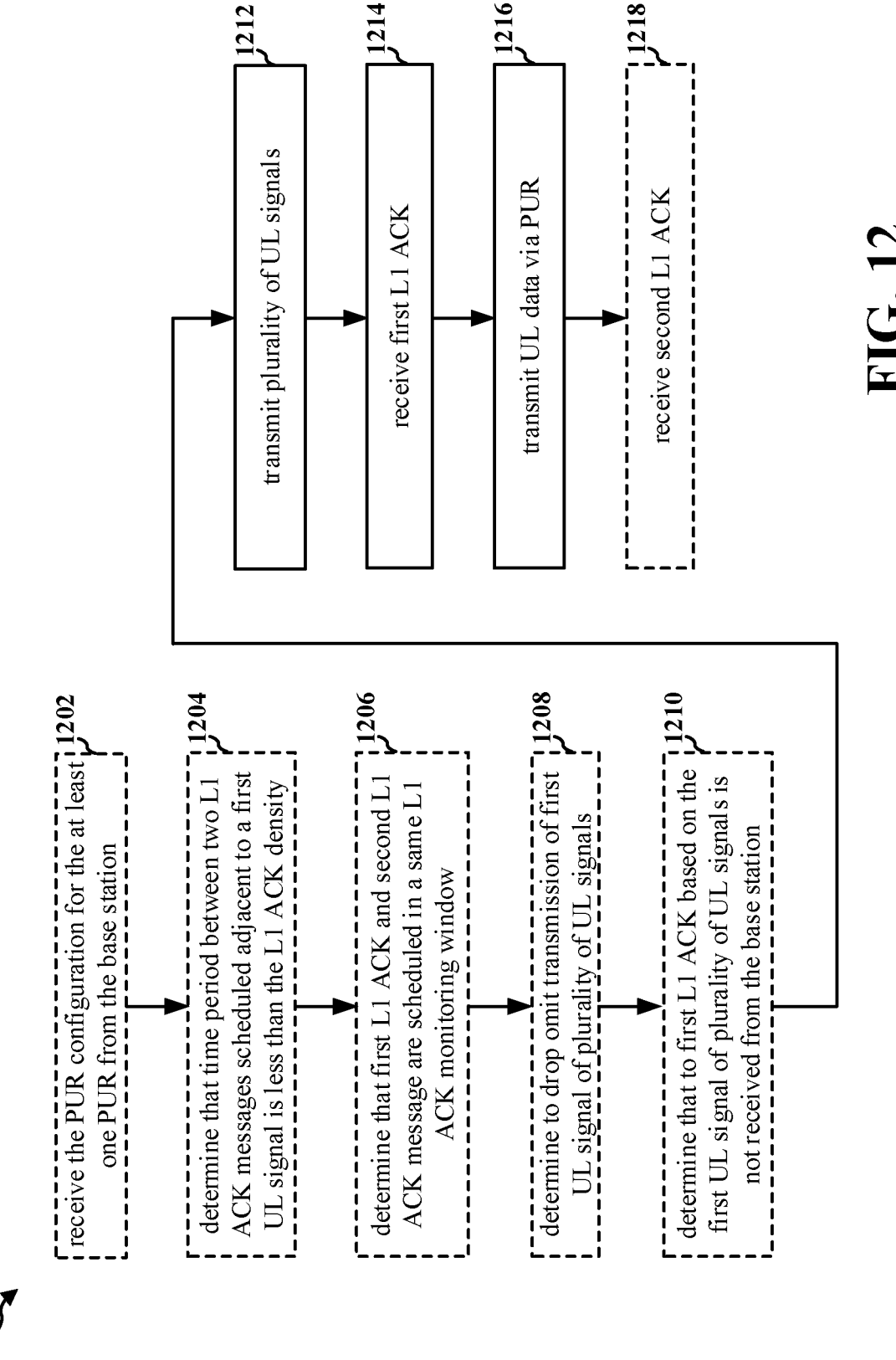
FIG. 12 is a flowchart of a method of wireless communication.

FIG. 12 is a flowchart 1200 of a method of wireless communication. The method may be performed by a UE (e.g., the UE 104/1102; the apparatus 1402). At 1202, the UE may be configured to receive the PUR configuration for the at least one PUR from the base station. The PUR configuration may indicate an L1 ACK monitoring window and/or an L1 ACK density. Based on the PUR configuration received from the base station, the UE may transmit the UL data via the PUR at 1134. The PUR configuration may indicate a time-domain location at which the first L1 ACK message is communicated at 1132 based on the transmission of the UL data via at least one PUR and a second time delay at which a second L1 ACK message is communicated at 1136 based on the transmission of the UL data via the at least one PUR. For example, the second time delay may be a PUR ACK delay. For example, 1202 may be performed by a PUR component 1440.

At 1204, the UE may be configured to determine that a time period between two L1 ACK messages scheduled adjacent to a first UL signal of the plurality of UL signals is less than the L1 ACK density indicated by the PUR configuration received from the base station at 1106. For example, 1204 may be performed by the PUR component 1440.

At 1206, the UE may be configured to determine that the first L1 ACK message of a first UL signal of the plurality of UL signals and the second L1 ACK message are scheduled for a reception in the same L1 ACK monitoring window. For example, 1206 may be performed by the PUR component 1440.

At 1208, the UE may be configured to determine to drop the transmission of the first UL signal based on at least one of the determination that the time period between two L1 ACK messages scheduled adjacent to the first UL signal of the plurality of UL signals is less than the L1 ACK density at 1204 or the determination that the first L1 ACK message and the second L1 ACK message are scheduled for a reception in the same L1 ACK monitoring window at 1206. For example, 1208 may be performed by the PUR component 1440.

At 1210, the UE may be configured to determine that the first L1 ACK message in response to the first UL signal is not received from the base station based on at least one of the determination that the time period between two L1 ACK messages scheduled adjacent to the first UL signal of the plurality of UL signals is less than the L1 ACK density at 1204 or the determination that the first L1 ACK message and the second L1 ACK message are scheduled for a reception in the same L1 ACK monitoring window at 1206. For example, 1210 may be performed by the PUR component 1440.

At 1212, the UE may be configured to transmit, to the base station, a plurality of UL signals, the UE being in one of an RRC idle mode or an RRC inactive mode. The plurality of UL signals may include one or more UL reference signals. In one aspect, the plurality of UL signals may include one or more SRS. In one aspect, the plurality of UL signals may include a dedicated signal for the at least one PUR associated with an estimation of at least one of a UL TA or a UL channel status. In another aspect, the plurality of UL signals may be configured independently from at least one PUR. In another aspect, the plurality of UL signals may be transmitted periodically or aperiodically. For example, 1212 may be performed by the PUR component 1440.

At 1214, the UE may be configured to receive, from the base station, the first L1 ACK message transmitted at 1212. The first L1 ACK message may include at least one of a TA update or a configuration update for the at least one PUR. The first L1 ACK message may be received at a time-domain location based on the transmission of the UL data via at least one PUR In one aspect, the first L1 ACK message may be received at the time domain location based on the transmission of the UL data via at least one PUR, the time domain location corresponding to the scheduled reception of the second L1 ACK. In another aspect, the first L1 ACK message may be received at the second time delay associated with the transmission of the plurality of UL signals. In another aspect, the first L1 ACK message may be received at a first time delay associated with the transmission of the UL data via at least one PUR, where the first time delay is different from the second time delay. For example, the first time delay may be a specific PUR ACK delay for the plurality of UL signals. In another aspect, the plurality of UL signals may be independently configured, and the first L1 ACK message may be received based on the independent configuration of the plurality of UL signals. For example, 1214 may be performed by the PUR component 1440.

At 1216, the UE may be configured to transmit, to the base station, UL data via at least one PUR based on the received first L1 ACK message at 1214. The transmission of the plurality of UL signals and the transmission of the UL data via the at least one PUR may be asynchronous. In one aspect, the transmission of the UL data via the at least one PUR may be based on the received PUR configuration received at 1102. For example, 1216 may be performed by the PUR component 1440.

At 1218, the UE may be configured to receive the second L1 ACK message based on the transmission of the UL data via the at least one PUR at 1216. The second L1 ACK message may be received from the base station at the second time delay associated with the transmission of the UL data via at least one PUR. In one aspect, the UE may receive one of the first L1 ACK message or the second L1 ACK message within the L1 ACK monitoring window, based on the PUR configuration received at 1202. For example, 1218 may be performed by the PUR component 1440.

FIG. 13 is a flowchart 1300 of a method of wireless communication. The method may be performed by a base station (e.g., the base station 102/180/1104; the apparatus 1502). At 1302, the base station may be configured to transmit a PUR configuration for at least one PUR to a UE. For example, 1302 may be performed by a PUR component 1540.

At 1304, the base station may be configured to determine that a time period between two L1 ACK messages scheduled adjacent to a first UL signal of the plurality of UL signals is less than the L1 ACK density. For example, 1304 may be performed by the PUR component 1540.

At 1306, the base station may be configured to determine that the first L1 ACK message of the first UL signal of the plurality of UL signals and the second L1 ACK message are scheduled for transmission in the same L1 ACK monitoring window. For example, 1306 may be performed by the PUR component 1540.

At 1310, the base station may be configured to determine to omit the transmission of the first L1 ACK message in response to the first UL signal to the UE based on at least one of the determination that the time period between two L1 ACK messages scheduled adjacent to the first UL signal of the plurality of UL signals is less than the L1 ACK density at 1304, or the determination that the first L1 ACK message and the second L1 ACK message are scheduled for transmission in the same L1 ACK monitoring window at 1306. For example, 1310 may be performed by the PUR component 1540.

At 1312, the base station may be configured to receive, from a UE in one of the RRC idle mode or the RRC inactive mode, a plurality of UL signals. The plurality of UL signals may include one or more UL reference signals. In one aspect, the plurality of UL signals may include one or more SRS. In one aspect, the plurality of UL signals may include a dedicated signal for the at least one PUR associated with an estimation of at least one of a UL TA or a UL channel status. In another aspect, the plurality of UL signals may be configured independently from at least one PUR. In another aspect, the plurality of UL signals may be transmitted periodically or aperiodically. For example, 1312 may be performed by the PUR component 1540.

At 1314, the base station may be configured to transmit, to the UE, a first L1 ACK message based on the plurality of UL signals received at 1312. The first L1 ACK message may include at least one of a TA update or a configuration update for the at least one PUR. The first L1 ACK message may be transmitted at a time-domain location based on the transmission of the UL data via at least one PUR. In one aspect, the first L1 ACK message may be transmitted at the time domain location based on the transmission of the UL data via at least one PUR, the time domain location corresponding to the scheduled reception of the second L1 ACK. In another aspect, the first L1 ACK message may be transmitted at the second time delay associated with the transmission of the plurality of UL signals. In another aspect, the first L1 ACK message may be transmitted at a first time delay associated with the transmission of the UL data via at least one PUR, where the first time delay is different from the second time delay. For example, the first time delay may be a specific PUR ACK delay for the plurality of UL signals. In another aspect, the plurality of UL signals may be independently configured, and the first L1 ACK message may be transmitted based on the independent configuration of the plurality of UL signals. For example, 1314 may be performed by the PUR component 1540.

At 1316, the base station may be configured to receive, from the UE, the UL data via at least one PUR based on the first L1 ACK message transmitted at 1314. The reception of the plurality of UL signals and the reception of the UL data via at least one PUR may be asynchronous. In one aspect, the reception of the UL data via at least one PUR may be based on the PUR configuration transmitted at 1106. For example, 1316 may be performed by the PUR component 1540.

At 1318, the base station may be configured to transmit the second L1 ACK message based on the reception of the UL data via the at least one PUR at 1316. The second L1 ACK message may be transmitted to the UE at the second time delay associated with the transmission of the UL data via the at least one PUR. In one aspect, the base station may transmit one of the first L1 ACK message or the second L1 ACK message within the L1 ACK monitoring window, based on the PUR configuration transmitted at 1302. For example, 1318 may be performed by the PUR component 1540.

Figure 14:
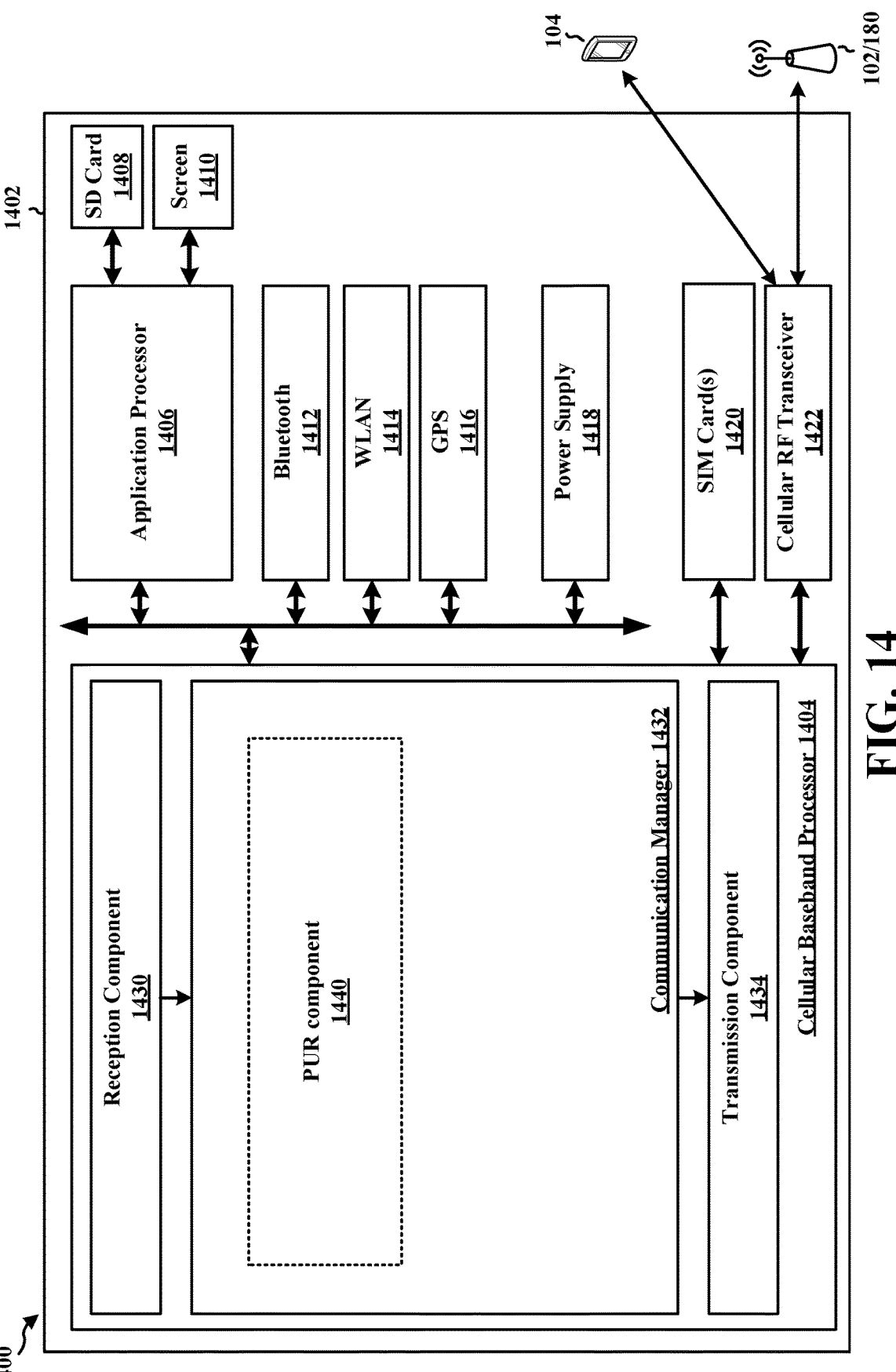
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a PUR component 1440 that is configured to receive the PUR configuration for the at least one PUR from the base station, determine that a time period between two L1 ACK messages scheduled adjacent to a first UL signal of the plurality of UL signals is less than the L1 ACK density, determine that the first L1 ACK message of a first UL signal of the plurality of UL signals and the second L1 ACK message are scheduled for reception in a same L1 ACK monitoring window, determine to drop the transmission of the first UL signal, determine that the first L1 ACK message in response to the first UL signal is not received from the base station, transmit a plurality of UL signals, the UE being in one of a RRC idle mode or an RRC inactive mode, receive the first L1 ACK message, transmit UL data via at least one PUR based on the received first L1 ACK message, and receive the second L1 ACK message, e.g., as described in connection with 1202, 1204, 1206, 1208, 1210, 1212, 1214, 1216, and 1218.

The apparatus may include additional components that perform each of the blocks of the algorithm in the aforementioned flowcharts of FIGS. 11 and 12. As such, each block in the aforementioned flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for transmitting, to a base station, a plurality of uplink (UL) signals, the UE being in one of an RRC idle mode or an RRC inactive mode, means for receiving, from the base station, a first L1 ACK message based on the transmission of the plurality of UL signals, and means for transmitting, to the base station, UL data via at least one PUR based on the received first L1 ACK message. The apparatus 1402 includes means for receiving a second L1 ACK message based on the transmission of the UL data via the at least one PUR, and means for receiving a second L1 ACK message based on the transmission of the UL data via the at least one PUR. The apparatus 1402 includes means for determining that a time period between two L1 ACK messages scheduled adjacent to a first UL signal of the plurality of UL signals is less than a L1 ACK density, and means for determining that the first L1 ACK message of a first UL signal of the plurality of UL signals and the second L1 ACK message are scheduled for reception in a same L1 ACK monitoring window. The apparatus 1402 includes means for determining that the first L1 ACK message in response to the first UL signal is not received from the base station and means for determining that the first L1 ACK message in response to the first UL signal is not received from the base station. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
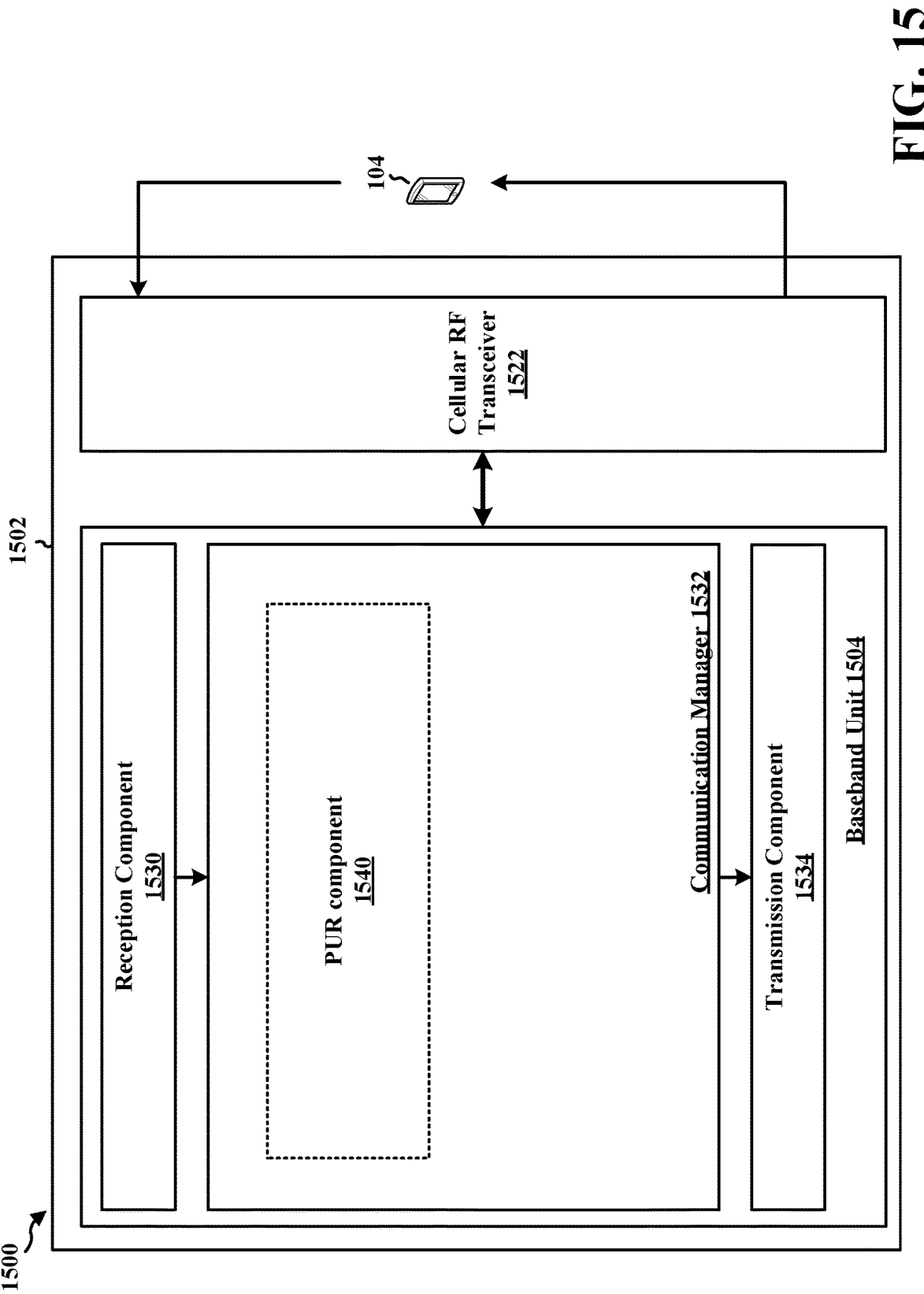
FIG. 15 is a diagram illustrating an example of a hardware implementation for an example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a PUR component 1540 that transmit a PUR configuration for the at least one PUR to a UE, determine that a time period between two L1 ACK messages scheduled adjacent to a first UL signal of the plurality of UL signals is less than the L1 ACK density, determine that the first L1 ACK message of the first UL signal of the plurality of UL signals and the second L1 ACK message are scheduled for transmission in a same L1 ACK monitoring window, determine to omit the transmission of the first L1 ACK message, receive a plurality of UL signals, transmit a first L1 ACK message based on the plurality of UL signals, receive the UL data via at least one PUR, and transmit the second L1 ACK message, e.g., as described in connection with 1302, 1304, 1306, 1310, 1312, 1314, 1316, and 1318.

The apparatus may include additional components that perform each of the blocks of the algorithm in the aforementioned flowcharts of FIGS. 11 and 13. As such, each block in the aforementioned flowcharts of FIGS. 11 and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving, from a UE in one of an RRC idle mode or an RRC inactive mode, a plurality of UL signals, means for transmitting, to the UE, a first L1 ACK message based on the received plurality of UL signals, and means for receiving, from the UE, UL data via at least one PUR based on the transmitted first L1 ACK message. The apparatus 1502 includes means for transmitting, to the UE, a PUR configuration for the at least one PUR, and means for transmitting a second L1 ACK message based on the reception of the UL data via the at least one PUR The apparatus 1502 includes means for determining that a time period between two L1 ACK messages scheduled adjacent to a first UL signal of the plurality of UL signals is less than a L1 ACK density and means for determining that the first L1 ACK message of a first UL signal of the plurality of UL signals and the second L1 ACK message are scheduled for transmission in a same L1 ACK monitoring window. The apparatus 1502 also includes means for determining to omit the transmission of the first L1 ACK message in response to the first UL signal to the UE. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

A UE may transmit, to a base station, a plurality of UL signals, the UE being in one of an RRC idle mode or an RRC inactive mode, receive, from the base station, a first L1 ACK message based on the transmission of the plurality of UL signals, and transmit, to the base station, UL data via at least one PUR based on the received first L1 ACK message.

In one aspect, the plurality of UL signals may include one or more UL reference signals. The plurality of UL signals may include one or more SRS. In another aspect, the transmission of the plurality of UL signals and the transmission of the UL data via the at least one PUR may be asynchronous. In another aspect, the first L1 ACK message may include at least one of a TA update or a configuration update for the at least one PUR. The plurality of UL signals may include a dedicated signal for the at least one PUR associated with an estimation of at least one of a UL TA or a UL channel status. The plurality of UL signals may be configured independently from the at least one PUR. The plurality of UL signals may be transmitted periodically or aperiodically.

The UE may receive a second L1 ACK message based on the transmission of the UL data via the at least one PUR, where the second L1 ACK message may be received from the base station at a second time delay associated with the transmission of the UL data via the at least one PUR In one aspect, the first L1 ACK message may be received at a time domain location based on the transmission of the UL data via the at least one PUR, where the time domain location corresponds to a scheduled reception of the second L1 ACK. In another aspect, the first L1 ACK message may be received at the second time delay associated with the transmission of the plurality of UL signals.

In another aspect, the first L1 ACK message may be received at a first time delay associated with the transmission of the UL data via the at least one PUR, where the first time delay is different from the second time delay. In another aspect, the plurality of UL signals may be independently configured, and the first L1 ACK message is received based on the independent configuration of the plurality of UL signals.

The UE may receive, from the base station, a PUR configuration for the at least one PUR, where the transmission of the UL data via the at least one PUR is based on the received PUR configuration. The PUR configuration may indicate at least one of an L1 ACK monitoring window, an L1 ACK density, or an L1 ACK density. The UE may receive a second L1 ACK message based on the transmission of the UL data via the at least one PUR, where the UE may receive one of the first L1 ACK message or the second L1 ACK message within the L1 ACK monitoring window.

The UE may determine that a time period between two L1 ACK messages scheduled adjacent to a first UL signal of the plurality of UL signals is less than a L1 ACK density. The UE may also determine that the first L1 ACK message of a first UL signal of the plurality of UL signals and the second L1 ACK message are scheduled for reception in a same L1 ACK monitoring window. The UE may determine to drop the transmission of the first UL signal based on one of the determination that the time period between two L1 ACK messages scheduled adjacent to the first UL signal of the plurality of UL signals is less than the L1 ACK density, or the determination that the first L1 ACK message of the first L1 ACK message and the second L1 ACK message are scheduled for reception in the same L1 ACK monitoring window.

The base station may determine that a time period between two L1 ACK messages scheduled adjacent to a first UL signal of the plurality of UL signals is less than a L1 ACK density. The base station may also determine that the first L1 ACK message of a first UL signal of the plurality of UL signals and the second L1 ACK message are scheduled for transmission in a same L1 ACK monitoring window. The base station may determine to omit the transmission of the first L1 ACK message in response to the first UL signal to the UE based on one of the determination that the first L1 ACK message and the second L1 ACK message are scheduled for transmission in the same L1 ACK monitoring window or the determination that the time period between two L1 ACK messages scheduled adjacent to the first UL signal of the plurality of UL signals is less than the L1 ACK density, where the PUR configuration indicates the L1 ACK density.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, the method including transmitting, to a base station, a plurality of UL reference signals, the UE being in one of an RRC idle mode or an RRC inactive mode, receiving, from the base station, a first L1 acknowledgement (ACK) message based on the transmission of the plurality of UL reference signals, the first L1 ACK message including a configuration update for at least one PUR, and transmitting, to the base station, UL data via at least one PUR based on the received first L1 ACK message.

Aspect 2 is the method of aspect 1, where the plurality of UL reference signals includes one or more SRS.

Aspect 3 is the method of any of aspects 1 and 2, where the transmission of the plurality of UL reference signals and the transmission of the UL data via the at least one PUR are asynchronous.

Aspect 4 is the method of any of aspects 1 to 3, where the configuration update for the at least one PUR includes a TA update.

Aspect 5 is the method of any of aspects 1 to 4, where the plurality of UL reference signals includes a dedicated signal for the at least one PUR associated with an estimation of at least one of a UL TA or a UL channel status.

Aspect 6 is the method of any of aspects 1 to 5, where the plurality of UL reference signals is configured independently from the at least one PUR.

Aspect 7 is the method of any of aspects 1 to 6, where the plurality of UL reference signals is transmitted periodically or aperiodically.

Aspect 8 is the method of any of aspects 1 to 7, further including receiving a second L1 ACK message based on the transmission of the UL data via the at least one PUR, where the second L1 ACK message is received from the base station at a second time delay associated with the transmission of the UL data via the at least one PUR.

Aspect 9 is the method of aspect 8, where the first L1 ACK message is received at a time domain location based on the transmission of the UL data via the at least one PUR, where the time domain location corresponds to a scheduled reception of the second L1 ACK.

Aspect 10 is the method of aspect 8, where the first L1 ACK message is received at the second time delay associated with the transmission of the plurality of UL reference signals.

Aspect 11 is the method of aspect 8, where the first L1 ACK message is received at a first time delay associated with the transmission of the UL data via the at least one PUR, where the first time delay is different from the second time delay.

Aspect 12 is the method of any of aspects 1 to 7, where the plurality of UL reference signals is independently configured, and the first L1 ACK message is received based on the independent configuration of the plurality of UL reference signals.

Aspect 13 is the method of any of aspects 1 to 12, further including receiving, from the base station, a PUR configuration for the at least one PUR, where the transmission of the UL data via the at least one PUR is based on the received PUR configuration.

Aspect 14 is the method of any of aspect 13, further including receiving a second L1 ACK message based on the transmission of the UL data via the at least one PUR, where the PUR configuration indicates an L1 ACK monitoring window, and the UE receives one of the first L1 ACK message or the second L1 ACK message within the L1 ACK monitoring window.

Aspect 15 is the method of any of aspect 14, further including determining that a time period between two L1 ACK messages scheduled adjacent to a first UL reference signal of the plurality of UL reference signals is less than a L1 ACK density, and determining that the first L1 ACK message in response to the first UL reference signal is not received from the base station based on the determination that the time period between two L1 ACK messages scheduled adjacent to the first UL reference signal of the plurality of UL reference signals is less than the L1 ACK density, where the PUR configuration indicates the L1 ACK density.

Aspect 16 is the method of any of aspect 14, further including determining that the first L1 ACK message of a first UL reference signal of the plurality of UL reference signals and the second L1 ACK message are scheduled for reception in a same L1 ACK monitoring window, and determining that the first L1 ACK message in response to the first UL reference signal is not received from the base station based on the determination that the first L1 ACK message and the second L1 ACK message are scheduled for reception in the same L1 ACK monitoring window.

Aspect 17 is the method of any of aspect 14, further including determining that a time period between two L1 ACK messages scheduled adjacent to a first UL reference signal of the plurality of UL reference signals is less than a L1 ACK density, and determining to drop the transmission of the first UL reference signal based on the determination that the time period between two L1 ACK messages scheduled adjacent to the first UL reference signal of the plurality of UL reference signals is less than the L1 ACK density, where the PUR configuration indicates the L1 ACK density.

Aspect 18 is the method of any of aspect 14, further including determining that the first L1 ACK message of a first UL reference signal of the plurality of UL reference signals and the second L1 ACK message are scheduled for reception in a same L1 ACK monitoring window, and determining to drop the transmission of the first UL reference signal based on the determination that the first L1 ACK message of the first L1 ACK message and the second L1 ACK message are scheduled for reception in the same L1 ACK monitoring window.

Aspect 19 is an apparatus for wireless communication including at least one processor coupled to a memory and configured to implement a method as in any of aspects 1 to 18.

Aspect 20 is an apparatus for wireless communication including means for implementing a method as in any of aspects 1 to 18.

Aspect 21 is a computer-readable medium storing computer executable code, where the code when executed by a processor causes the processor to implement a method as in any of aspects 1 to 18.

Aspect 22 is a method of wireless communication of a base station, the method including receiving, from a UE in one of an RRC idle mode or an RRC inactive mode, a plurality of UL reference signals, transmitting, to the UE, a first L1 ACK message based on the received plurality of UL reference signals, the first L1 ACK message including a configuration update for at least one PUR, and receiving, from the UE, UL data via the at least one PUR based on the transmitted first L1 ACK message.

Aspect 23 is the method of aspect 22, where the plurality of UL reference signals includes one or more SRS.

Aspect 24 is the method of any of aspects 22 and 23, where the reception of the plurality of UL reference signals and the reception of the UL data via at least one PUR are asynchronous.

Aspect 25 is the method of any of aspects 22 to 24, where the first L1 ACK message includes at least one of a TA update or a configuration update for the at least one PUR.

Aspect 26 is the method of any of aspects 22 to 25, where the plurality of UL reference signals includes a dedicated signal for the at least one PUR associated with an estimation of at least one of a UL TA or a UL channel status.

Aspect 27 is the method of any of aspects 22 to 26, where the plurality of UL reference signals is configured independently from the at least one PUR.

Aspect 28 is the method of any of aspects 22 to 27, where the plurality of UL reference signals is received periodically or aperiodically.

Aspect 29 is the method of any of aspects 22 to 28, further including transmitting a second L1 ACK message based on the received UL data via the at least one PUR, where the second L1 ACK message is transmitted to the UE at a second time delay associated with the reception of the UL data via the at least one PUR.

Aspect 30 is the method of aspect 29, where the first L1 ACK message is transmitted at a time domain location based on the received UL data via the at least one PUR, where the time domain location corresponds to a scheduled transmission of the second L1 ACK.

Aspect 31 is the method of aspect 29, where the first L1 ACK message is transmitted at the second time delay associated with the reception of the plurality of UL reference signals.

Aspect 32 is the method of aspect 29, where the first L1 ACK message is transmitted at a first time delay associated with the reception of the UL data via the at least one PUR, where the first time delay is different from the second time delay.

Aspect 33 is the method of any of aspects 22 to 28, where the plurality of UL reference signals is independently configured, and the first L1 ACK message is transmitted based on the independent configuration of the plurality of UL reference signals.

Aspect 34 is the method of any of aspects 22 to 33, further including transmitting, to the UE, a PUR configuration for the at least one PUR, where the UL data via the at least one PUR is received based on the transmitted PUR configuration.

Aspect 35 is the method of any of aspect 34, further including transmitting a second L1 ACK message based on the reception of the UL data via the at least one PUR, where the PUR configuration indicates an L1 ACK monitoring window, and the base station transmits one of the first L1 ACK message or the second L1 ACK message within the L1 ACK monitoring window.

Aspect 36 is the method of any of aspect 35, further including determining that a time period between two L1 ACK messages scheduled adjacent to a first UL reference signal of the plurality of UL reference signals is less than a L1 ACK density, and determining to omit the transmission of the first L1 ACK message in response to the first UL reference signal to the UE based on the determination that the time period between two L1 ACK messages scheduled adjacent to the first UL reference signal of the plurality of UL reference signals is less than the L1 ACK density, where the PUR configuration indicates the L1 ACK density.

Aspect 37 is the method of any of aspect 35, further including determining that the first L1 ACK message of a first UL reference signal of the plurality of UL reference signals and the second L1 ACK message are scheduled for transmission in a same L1 ACK monitoring window, and determining to omit the transmission of the first L1 ACK message in response to the first UL reference signal to the UE based on the determination that the first L1 ACK message and the second L1 ACK message are scheduled for transmission in the same L1 ACK monitoring window.

Aspect 38 is an apparatus for wireless communication including at least one processor coupled to a memory and configured to implement a method as in any of aspects 22 to 37.

Aspect 39 is an apparatus for wireless communication including means for implementing a method as in any of aspects 22 to 37.

Aspect 40 is a computer-readable medium storing computer executable code, where the code when executed by a processor causes the processor to implement a method as in any of aspects 22 to 37.

What is claimed is:

1. An apparatus for wireless communication of a user equipment (UE), comprising:
   memory; and
   at least one processor coupled to the memory and configured to:
      transmit, to a base station, a plurality of uplink (UL) reference signals, the UE being in one of a radio resource control (RRC) idle mode or an RRC inactive mode;
      receive, from the base station, a first physical layer (L1) acknowledgement (ACK) message based on the transmission of the plurality of UL reference signals, the first L1 ACK message including a configuration update for at least one preconfigured uplink resource (PUR);
      receive, from the base station, a PUR configuration that indicates an L1 ACK density for the at least one PUR or an L1 monitoring window; and
      transmit, to the base station based on the PUR configuration, UL data via the at least one PUR based on the first L1 ACK message.

2. The apparatus of claim 1, wherein the plurality of UL reference signals includes one or more sounding reference signals (SRS).

3. The apparatus of claim 1, wherein the transmission of the plurality of UL reference signals and the transmission of the UL data via the at least one PUR are asynchronous.

4. The apparatus of claim 1, wherein the configuration update for the at least one PUR includes a timing advance (TA) update.

5. The apparatus of claim 1, wherein the plurality of UL reference signals includes a dedicated signal for the at least one PUR associated with an estimation of at least one of a UL timing advance (TA) or a UL channel status.

6. The apparatus of claim 1, wherein the plurality of UL reference signals is configured independently from the at least one PUR.

7. The apparatus of claim 1, wherein to transmit the plurality of UL reference signals, the at least one processor is configured to transmit the plurality of UL reference signals periodically or aperiodically.

8. The apparatus of claim 1, wherein the at least one processor is further configured to receive, from the base station, a second L1 ACK message based on the transmission of the UL data via the at least one PUR, and
   wherein the second L1 ACK message is associated with a second time delay associated with the transmission of the UL data via the at least one PUR.

9. The apparatus of claim 8, wherein the first L1 ACK message is associated with a time domain location based on the transmission of the UL data via the at least one PUR, wherein the time domain location corresponds to a scheduled reception of the second L1 ACK.

10. The apparatus of claim 8, wherein the first L1 ACK message is associated with the second time delay associated with the transmission of the plurality of UL reference signals.

11. The apparatus of claim 8, wherein the first L1 ACK message is associated with a first time delay associated with the transmission of the UL data via the at least one PUR, wherein the first time delay is different from the second time delay.

12. The apparatus of claim 1, wherein the plurality of UL reference signals is independently configured, and the first L1 ACK message is based on the independent configuration of the plurality of UL reference signals.

13. The apparatus of claim 1, wherein the at least one processor is further configured to receive a second L1 ACK message based on the transmission of the UL data via the at least one PUR, and
   wherein the PUR configuration indicates the L1 ACK monitoring window, and the UE receives one of the first L1 ACK message or the second L1 ACK message within the L1 ACK monitoring window.

14. The apparatus of claim 13, wherein the at least one processor is further configured to:
   determine that a time period between two L1 ACK messages scheduled adjacent to a first UL reference signal of the plurality of UL reference signals is less than the L1 ACK density; and
   determine that the first L1 ACK message in response to the first UL reference signal is not received from the base station based on the determination that the time period between two L1 ACK messages scheduled adjacent to the first UL reference signal of the plurality of UL reference signals is less than the L1 ACK density.

15. The apparatus of claim 13, wherein the at least one processor is further configured to:
   determine that the first L1 ACK message of a first UL reference signal of the plurality of UL reference signals and the second L1 ACK message are scheduled for reception in the L1 ACK monitoring window; and
   determine that the first L1 ACK message in response to the first UL reference signal is not yet received from the base station based on the determination that the first L1 ACK message and the second L1 ACK message are scheduled for reception in the L1 ACK monitoring window.

16. The apparatus of claim 13, wherein the at least one processor is further configured to:
   determine that a time period between two L1 ACK messages scheduled adjacent to a first UL reference signal of the plurality of UL reference signals is less than the L1 ACK density; and
   determine to drop the transmission of the first UL reference signal based on the determination that the time period between two L1 ACK messages scheduled adjacent to the first UL reference signal of the plurality of UL reference signals is less than the L1 ACK density.

17. The apparatus of claim 13, wherein the at least one processor is further configured to:

determine that the first L1 ACK message of a first UL reference signal of the plurality of UL reference signals and the second L1 ACK message are scheduled for reception in the L1 ACK monitoring window; and determine to drop the transmission of the first UL reference signal based on the determination that the first L1 ACK message of the first L1 ACK message and the second L1 ACK message are scheduled for reception in the L1 ACK monitoring window.

18. A method of wireless communication of a user equipment (UE), comprising:

transmitting, to a base station, a plurality of uplink (UL) reference signals, the UE being in one of a radio resource control (RRC) idle mode or an RRC inactive mode;

receiving, from the base station, a first physical layer (L1) acknowledgement (ACK) message based on the transmission of the plurality of UL reference signals, the first L1 ACK message including a configuration update for at least one preconfigured uplink resource (PUR);

receiving, from the base station, a PUR configuration that indicates an L1 ACK density for the at least one PUR or an L1 monitoring window; and transmitting, to the base station based on the PUR configuration, UL data via the at least one PUR based on the first L1 ACK message.

19. An apparatus for wireless communication of a base station, comprising:

memory; and at least one processor coupled to the memory and configured to:

receive, from a user equipment (UE) in one of a radio resource control (RRC) idle mode or an RRC inactive mode, a plurality of uplink (UL) reference signals;

transmit, to the UE, a first physical layer (L1) acknowledgement (ACK) message based on the received plurality of UL reference signals, the first L1 ACK message including a configuration update for at least one preconfigured uplink resource (PUR);

transmit, to the UE, a PUR configuration that indicates an L1 ACK density for the at least one PUR or an L1 monitoring window; and receive, from the UE, UL data via the at least one PUR based on the first L1 ACK message and at least one of the L1 ACK density or the L1 monitoring window.

20. The apparatus of claim 19, wherein the plurality of UL reference signals includes one or more sounding reference signals (SRS).

21. The apparatus of claim 19, wherein the at least one processor is further configured to transmit, to the UE, a second L1 ACK message based on the received UL data via the at least one PUR, and wherein the second L1 ACK message is associated with a second time delay associated with the reception of the UL data via the at least one PUR.

22. The apparatus of claim 21, wherein the first L1 ACK message is associated with a time domain location based on the received UL data via the at least one PUR, wherein the time domain location corresponds to a scheduled transmission of the second L1 ACK.

23. The apparatus of claim 21, wherein the first L1 ACK message is associated with the second time delay associated with the reception of the plurality of UL reference signals.

24. The apparatus of claim 21, wherein the first L1 ACK message is associated with a first time delay associated with the reception of the UL data via the at least one PUR, wherein the first time delay is different from the second time delay.

25. The apparatus of claim 21, wherein the at least one processor is further configured to transmit a second L1 ACK message based on the reception of the UL data via the at least one PUR, and wherein the PUR configuration indicates the L1 ACK monitoring window, one of the first L1 ACK message or the second L1 ACK message is within the L1 ACK monitoring window.

26. The apparatus of claim 25, wherein the at least one processor is further configured to:

determine that a time period between two L1 ACK messages scheduled adjacent to a first UL reference signal of the plurality of UL reference signals is less than the L1 ACK density; and determine to omit the transmission of the first L1 ACK message in response to the first UL reference signal to the UE based on the determination that the time period between two L1 ACK messages scheduled adjacent to the first UL reference signal of the plurality of UL reference signals is less than the L1 ACK density, and wherein the PUR configuration indicates the L1 ACK density.

27. The apparatus of claim 25, wherein the at least one processor is further configured to:

determine that the first L1 ACK message of a first UL reference signal of the plurality of UL reference signals and the second L1 ACK message are scheduled for transmission in the L1 ACK monitoring window; and determine to omit the transmission of the first L1 ACK message in response to the first UL reference signal to the UE based on the determination that the first L1 ACK message and the second L1 ACK message are scheduled for transmission in the L1 ACK monitoring window.

28. A method of wireless communication of a base station, comprising:

receiving, from a user equipment (UE) in one of a radio resource control (RRC) idle mode or an RRC inactive mode, a plurality of uplink (UL) reference signals;

transmitting, to the UE, a first physical layer (L1) acknowledgement (ACK) message based on the received plurality of UL reference signals, the first L1 ACK message including a configuration update for at least one preconfigured uplink resource (PUR);

transmitting, to the UE, a PUR configuration that indicates an L1 ACK density for the at least one PUR or an L1 monitoring window; and receiving, from the UE, UL data via the at least one PUR based on the first L1 ACK message and at least one of the L1 ACK density or the L1 monitoring window.

* * * * *